(12) United States Patent     (10) Patent No.: US 9,351,480 B2
Tuan et al.     (45) Date of Patent: May 31, 2016

(54) FISH FOOD DISPENSER

(71) Applicants: Ling Liu Tuan, Bountiful, UT (US); Charles T. Tuan, Bountiful, UT (US)

(72) Inventors: Ling Liu Tuan, Bountiful, UT (US); Charles T. Tuan, Bountiful, UT (US)

( * ) Notice: Subject to any disclaimer, the term of this patent is extended or adjusted under 35 U.S.C. 154(b) by 68 days.

(21) Appl. No.: 14/142,500

(22) Filed: Dec. 27, 2013

(65) Prior Publication Data

US 2014/0261215 A1    Sep. 18, 2014

Related U.S. Application Data

(63) Continuation-in-part of application No. 13/796,749, filed on Mar. 12, 2013.

(51) Int. Cl.
   *A01K 63/04*       (2006.01)
   *A01K 61/02*       (2006.01)
   *A01K 63/06*       (2006.01)

(52) U.S. Cl.
CPC .............. *A01K 61/025* (2013.01); *A01K 63/06* (2013.01)

(58) Field of Classification Search
CPC ............................. A01K 61/025; A01K 63/06
USPC ......... 119/245, 246, 247, 264, 265, 266, 269, 119/51.04, 267
See application file for complete search history.

(56) References Cited

U.S. PATENT DOCUMENTS

| | | |
|---|---|---|
| 2,002,380 A | 5/1935 | Wernicke |
| 2,847,973 A | 8/1958 | Pugh |
| 2,988,312 A | 9/1959 | Dumas |
| 2,961,994 A | 11/1960 | Kopietz |
| 2,984,208 A | 5/1961 | Kopietz |
| 3,208,090 A | 9/1965 | Roesel, Jr. |
| 3,499,526 A | 3/1970 | Willinger |
| 3,683,177 A | 8/1972 | Veloz |
| 3,749,901 A | 7/1973 | Clough |
| 4,175,513 A | 11/1979 | Roehrick |
| 4,787,336 A | 11/1988 | Lineberry |

(Continued)

FOREIGN PATENT DOCUMENTS

| | | |
|---|---|---|
| EP | 1139729 | 4/2002 |
| GB | 2105977 | 4/1983 |
| WO | 0040080 | 7/2000 |

OTHER PUBLICATIONS

The International Search Report and the Written Opinion of the International Searching Authority and Search History from International Application No. PCT/US2014/039922 dated Jan. 23, 2015 (18 pages).

(Continued)

*Primary Examiner* — Kristen C Hayes
*Assistant Examiner* — Ebony Evans
(74) *Attorney, Agent, or Firm* — Workman Nydegger

(57) ABSTRACT

A fish food dispensing assembly is comprised of: (A) a handle member; (B) a perforated container that is selectively magnetically linked to a handle member; and (C) a fish food containment ring configured to be magnetically linked to the perforated container and to the handle member. The perforated container is configured to receive fish food therein and is placed within the containment ring such that the fish food dispensed within the aquarium is substantially dispensed within a specific location within the aquarium. A floating containment ring orients a brush plate in convenient parallel position for convenient linking to the handle member. LEDs on the handle member provide illumination in different colors.

20 Claims, 18 Drawing Sheets

(56) References Cited

U.S. PATENT DOCUMENTS

| | | | |
|---|---|---|---|
| 4,977,637 | A | 12/1990 | Demers |
| 5,067,059 | A | 11/1991 | Hwang |
| 5,067,060 | A | 11/1991 | Sieracki |
| 5,361,195 | A | 11/1994 | Chen |
| 5,515,570 | A | 5/1996 | Muscroft |
| 5,778,824 | A | 7/1998 | Musgrave et al. |
| 5,988,109 | A | 11/1999 | Rofen |
| 6,070,554 | A | 6/2000 | Wilson |
| 6,109,210 | A | 8/2000 | Nasser |
| 6,314,910 | B1 | 11/2001 | Tracy |
| 6,348,104 | B1 | 2/2002 | Bakker |
| 7,059,270 | B1 | 6/2006 | Loginov |
| 7,506,612 | B2 | 3/2009 | Enoch, III et al. |
| 7,784,428 | B2 | 8/2010 | Deng |
| 8,065,975 | B2 | 11/2011 | Allis |
| 8,161,909 | B2 * | 4/2012 | Sprung .................. 119/264 |
| 8,166,921 | B2 * | 5/2012 | Biggs ..................... 119/246 |
| 8,240,867 | B2 | 8/2012 | Wang |
| 8,568,009 | B2 | 10/2013 | Chiang et al. |
| 8,720,377 | B1 | 5/2014 | McLean |
| 9,089,116 | B2 | 7/2015 | Tuan |
| 2002/0171377 | A1 | 11/2002 | Mueller |
| 2007/0107665 | A1 | 5/2007 | Enoch, III et al. |
| 2007/0193525 | A1 | 8/2007 | Vaccari |
| 2007/0279900 | A1 | 12/2007 | Bauer et al. |
| 2009/0147502 | A1 | 6/2009 | Aleman |
| 2009/0250011 | A1 * | 10/2009 | Biggs ..................... 119/246 |
| 2010/0116217 | A1 | 5/2010 | Allis |
| 2011/0056437 | A1 | 3/2011 | Sprung |
| 2012/0044713 | A1 | 2/2012 | Chiang |
| 2012/0060763 | A1 | 3/2012 | Lin |
| 2012/0085290 | A1 | 4/2012 | Rafailovich |
| 2012/0285057 | A1 * | 11/2012 | Pearce ..................... 40/406 |
| 2013/0284101 | A1 | 10/2013 | Bagnall |

OTHER PUBLICATIONS

Pages from www.acquariumguys.com printed on Feb. 6, 2013, 8 pages.
The International Search Report and the Written Opinion of the International Search Authority, or the Declaration, PCT Application PCT/US13/31305 dated May 29, 2013, 17 pages.
Top Fin Small Magnet Cleaner, packaging and device, publicly available, and sold at least as early as Feb. 2012, (12 pages).
Top Fin Medium Magnet Cleaner, packaging and device, publicly available, and sold at least as early as Feb. 2012, (9 pages).
Mag Float, Floating Aquarium Cleaner, packaging and device, publicly available, and sold at least as early as Feb. 2012, (9 pages).
Aqua Tech, Magnetic Algae Remover, packaging and device, publicly available, and sold at least as early as Feb. 2012, (10 pages).
PCT Recordation of Search History, International Application No. PCT/US13178109, accompanying International Search Report dated Mar. 28, 2014 (10 pages).
Invitation to Pay Additional Fees and, Where Applicable, Protest Fee from PCT/US2014/039922, dated Sep. 24, 2014 (2 pages).
Pages from elivepet.com, printed on Apr. 16, 2014 (26 pages).
Notification of Transmittal of the International Search Report and the Written Opinion of the International Searching Authority, or the Declaration dated Mar. 28, 2014 (15 pages).
Office Action from U.S. Appl. No. 13/796,749 dated Aug. 14, 2014 (9 pages).
Photos of Logitech computer mouse with laser, which was publicly available and sold at least as early as Feb. 2013, on information and belief (12 pages).
http://www.aquariumguys.com/magfloat350.html; Aquarium Guys; Mag Float-350 Magnetic Glass Cleaner; printed Feb. 6, 2013 (3 pages).
http://www.aquariumguys.com/magnetcleaner2.html; Aquarium Guys; Hagen Extra Large Algae Magnetic Cleaner; printed Feb. 6, 2013 (3 pages).
http://www.aquariumguys.com/magnetscraperhtml; Aquarium Guys; Penn Plax Magnet Scraper; printed Feb. 6, 2013 (3 pages).
http://www.aquariumguys.com/glasscare-brush.html; Aquarium Guys; Glasscare Brush for Magnetic Algae Cleaners; printed Feb. 6, 2013 (3 pages).
http://www.aquariumguys.com/magfloat-30-acrylic-cleaner.html; Aquarium Guys; Mag Float-30 Magnetic Cleaner for Acrylic; printed Feb. 6, 2013 (3 pages).
http://freshaquarium.about.com/od/feedingfis1/a/feedingrings.htm: About.com; Shirlie Sharpe; Fish Feeding Rings; printed Feb. 7, 2013 (1 page).
http://www.new-era-aquaculture.com/fish-food/marine-range/mini-marinegrazer; New Era Aquaculture; Mini MarineGrazer; printed Feb. 7, 2013 (4 pages).
http://www.fishtanksdirect.com/newera110gramminimarinegrazer.aspx; New Era 110 Gram Mini Marine Grazer; printed Feb. 7, 2013 (4 pages).
http://www.bigalspets.com/cone-worm-feeder.html?utm_source=Google+Products&utm_ca . . . ; Big Al's Online; Lee's Cone Worm Feeder; printed Feb. 7, 2013 (1 page).
Google Image Result for http://reefbuilders.com/files/2011/09/mini-marine-grazer-2.png; Google Image Result, printed Feb. 7, 2013 (1 page).
http://www.youtube.com/watch?v=ZB-IwIv3nLw; YouTube: New Era mini Marine Grazer; printed Feb. 7, 2013 (3 pages).
http://www.arcatapet.com/item.cfm?cat=455&source=GA-PLA005455; Arcata Pet Supplies; Worm Fish Feeder 4-way Ring and Cone; printed Feb. 7, 2013 (1 page).
Google Image Result for http://blog.aquanerd.com/wp-content/uploads/2012/03/New-Era-MarineGrazer.jpg; Google Image Result, printed Feb. 7, 2013 (1 page).
Google Image Result for http://reefbuilders.com/files/2011/09/mini-marine-grazer-4.png; Google Image Result, printed Feb. 7, 2013 (1 page).
http://blog.aquanerd.com/2012/10/new-era-aquaculture-to-release-smaller-mini-marinegrazer.html; Brandon Klaus; Reef Aquarium and Saltwater Hobbyist Blog; New Era Aquaculture to Release Smaller Mini MarineGrazer; printed Feb. 7, 2013 (9 pages).
http://www.aquariumguys.com/magnetic-cleaners.html; Aquarium Guys; Magnetic Aquarium Cleaners; printed Feb. 6, 2013 (3 pages).
U.S. Appl. No. 13/796,749, Jun. 25, 2014, NOA.
U.S. Appl. No. 13/796,749, Jul. 8, 2015, Issue notification.
U.S. Appl. No. 14/288,675, Dec. 9, 2015, Office Action.

* cited by examiner

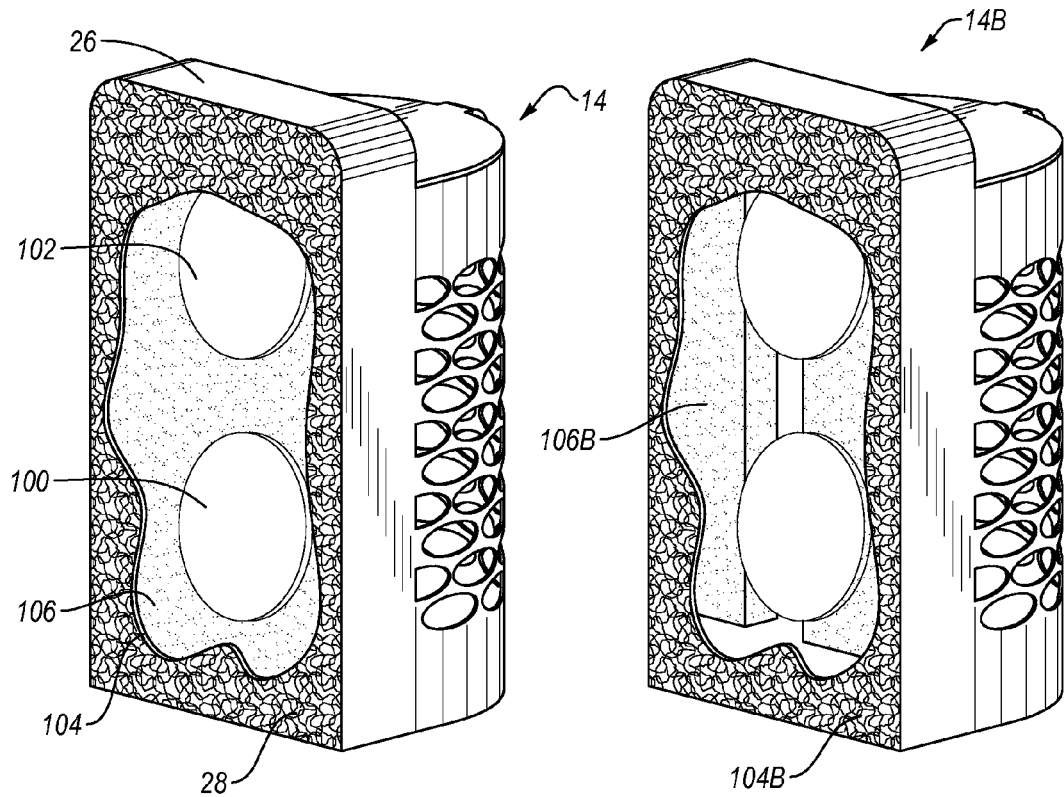
*FIG. 11A*  *FIG. 11B*
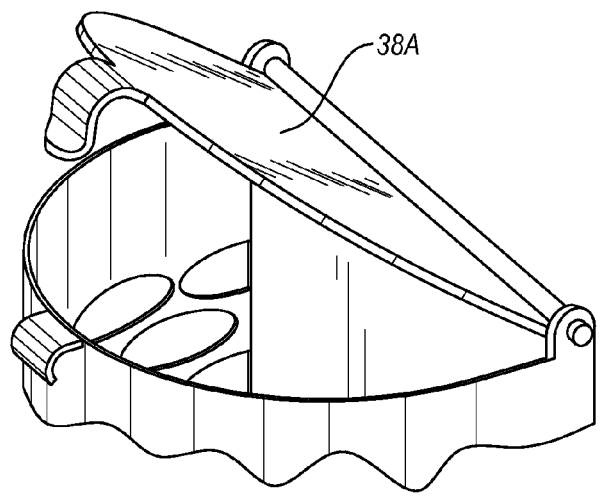
*FIG. 12*

FISH FOOD DISPENSER

This application is a continuation-in-part of U.S. non-provisional patent application Ser. No. 13/796,749, filed on Mar. 12, 2013, entitled FISH FOOD DISPENSER, which is incorporated herein in its entirety by reference.

BACKGROUND OF THE INVENTION

1. The Field of the Invention

This invention is in the field of aquariums and related devices.

2. The Relevant Technology

Fish aquariums are popular in home, commercial, agricultural, and industrial settings, providing educational and recreational experiences and food sources. Aquariums are designed to form habitat in which marine life, including fish, can exist and thrive for the benefit of a home, business and community. One benefit of having an aquarium filled with marine life is the opportunity to view and interact with the marine life in a setting distant from oceans, lakes and rivers, for example.

A primary aspect of the creation and maintenance of a marine habitat is providing sufficient nutrients in the form of food for the marine wildlife, in proper quantities and proportion, such that the marine life will be sustained, prosper and thrive. Another responsibility is to maintain the aquarium in a clean, fragrant and presentable fashion.

Commonly, the goal of feeding and maintaining the environment of marine wildlife is complicated by the need to maintain a clean aquarium environment. If left unattended, an aquarium becomes crowded, dirty, and shrouded in unwanted films.

Another problem relating to the feeding of fish is that certain fish food, e.g. pellets, are often of a hard type that may injure the inside of a fish's mouth. Some fish swallow food without chewing it first, which can cause injuries, particularly with such hard food.

It is therefore desirable to develop systems and technologies that encourage and enhance the ability of an aquarium caretaker to feed marine life in a suitable and proper manner. It is also desirable to have cleaning systems that encourage the convenient and thorough cleaning of an aquarium.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIGS. 11A and 11B demonstrate cut away views of alternate perforated containers containing a foam material, which causes the containers to float in an aquarium when magnetically disengaged from the handle member.

FIG. 12 shows another example of a lid 38a movably coupled to the plate of a perforated container of the present invention.

DETAILED DESCRIPTION OF THE PREFERRED EMBODIMENTS

Figure 1:
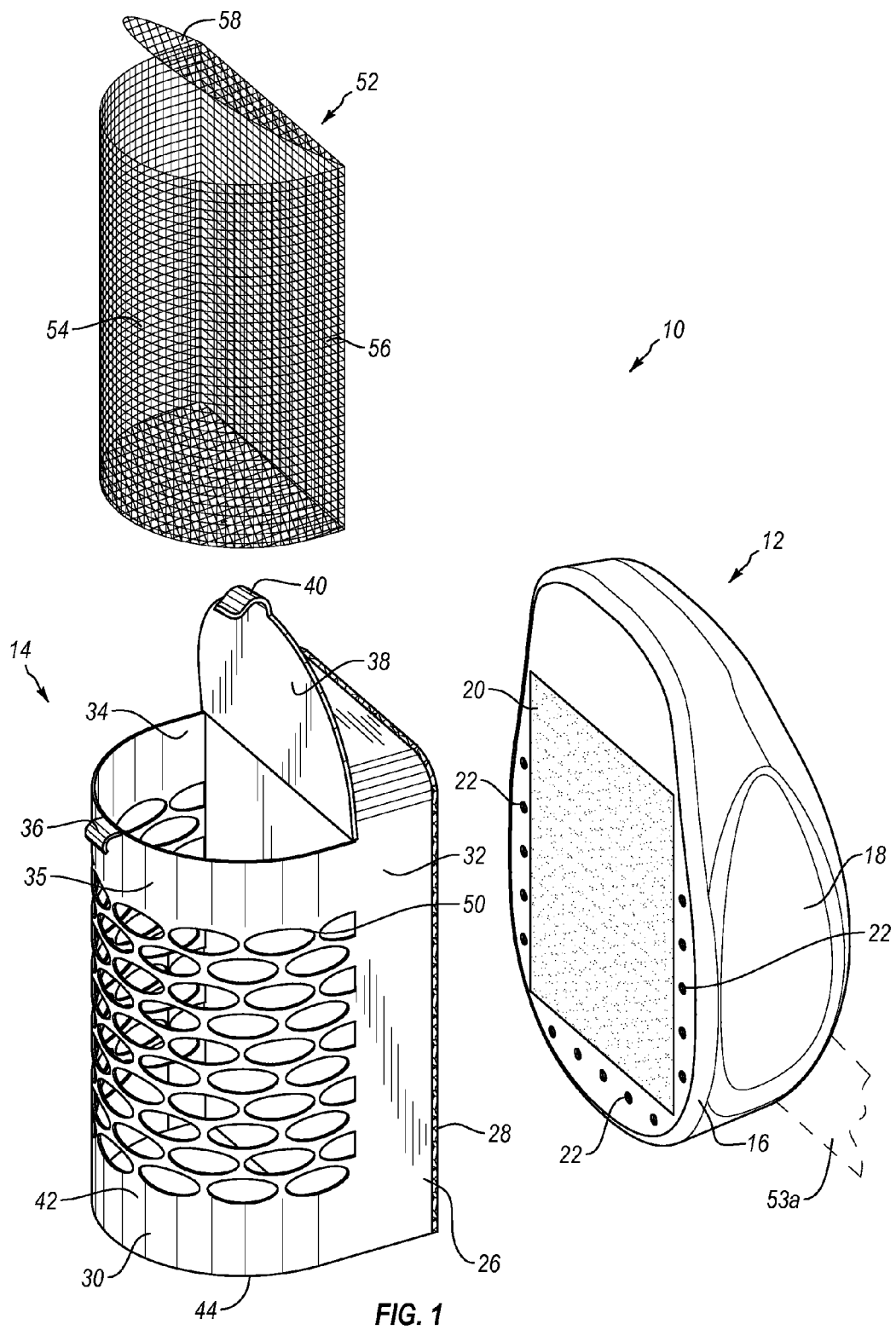
FIG. 1 demonstrates a fish food dispensing assembly 10 of the present invention, assembly 10 being shown in an exploded view.

FIG. 1 shows a fish food dispensing assembly 10 of the present invention. Assembly 10 comprises a handle member 12 and a perforated container 14, that are selectively, magnetically linked to each other while on opposite sides of a panel of a fish aquarium in order to clean and/or dispense food from perforated container 14 in a liquid environment (such as water). In light of the magnetic coupling, the position of container 14 can be selectively moved by moving handle 12. Liquid within an aquarium moistens fish food within the perforated container 14 and moves the fish food out of perforations in the perforated container 14.

Handle member 12 comprises a substantially flat plate 16, having an ergonomic grip 18 coupled thereto (e.g. integrally extending therefrom) for grasping handle member 12, and placing handle member 12 adjacent the panel of the aquarium. In one embodiment, a soft cleaning material 20 configured to clean and shine an aquarium panel, such as felt, cloth, textile or other non-scratch material is mounted on plate 16 in order to shine the panel of the aquarium, which may be comprised of a transparent or translucent material such as glass, plastic or other material suitable for containing liquid and visualizing marine life there-through, for example.

Figures 2, 3:
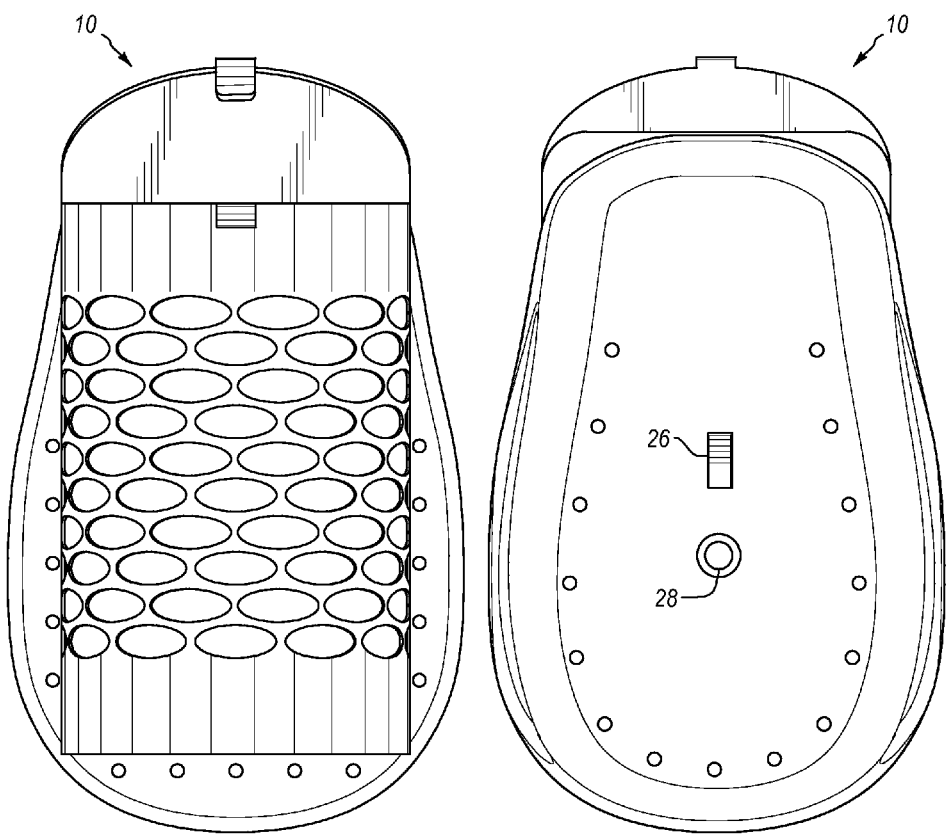
FIG. 2 demonstrates assembly 10 of FIG. 1A in a front view.
FIG. 3 demonstrates assembly 10 of FIG. 1A in a rear view.
Figure 4:
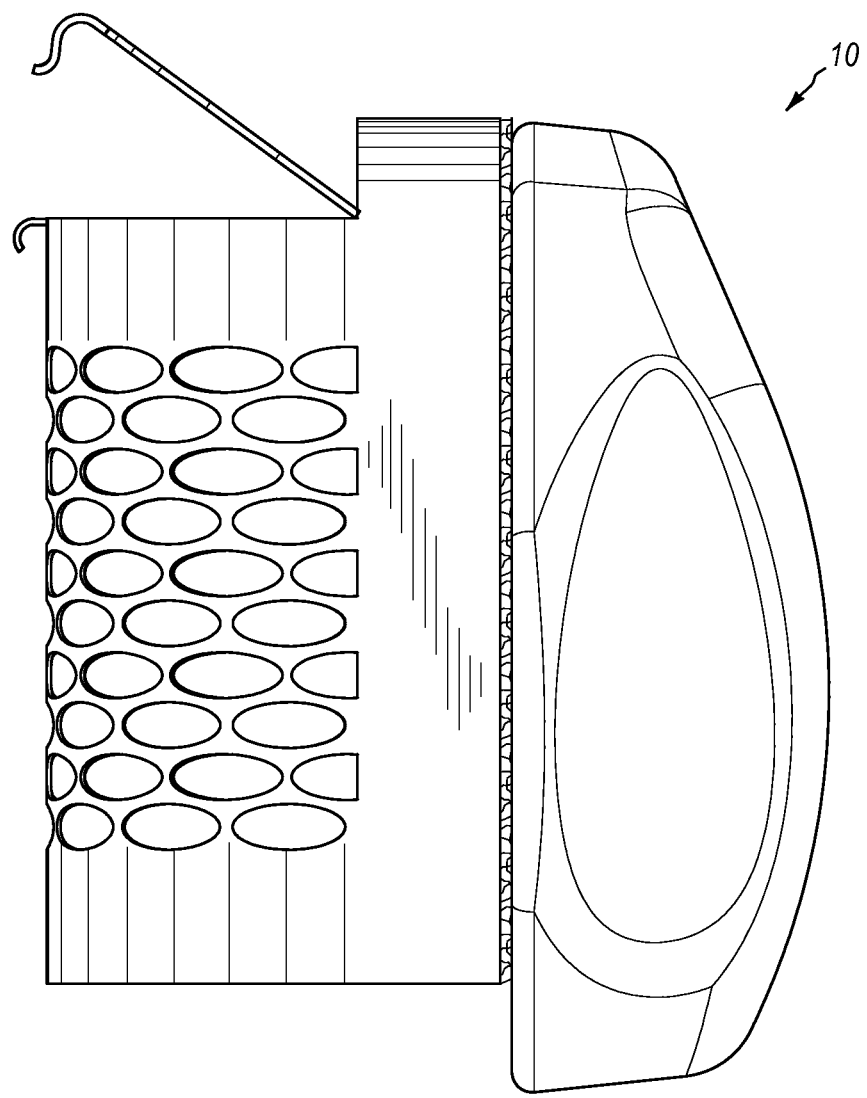
FIG. 4 demonstrates assembly 10 of FIG. 1A in a side view with FIG. 5 being an opposing side view thereof.
Figure 5:
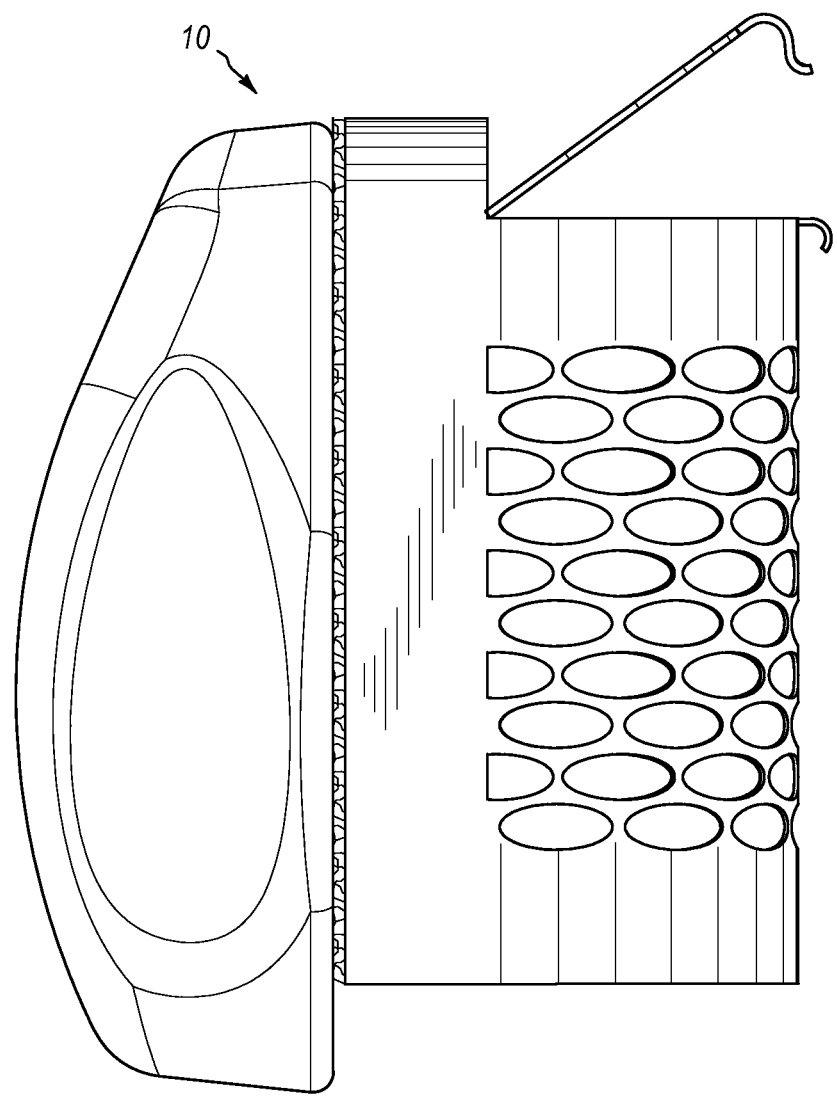
Figure 6:
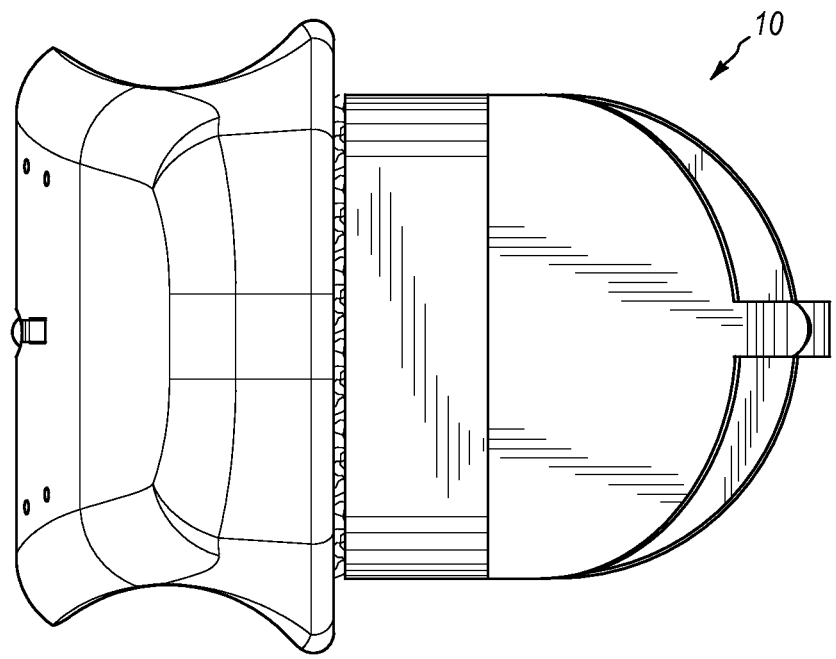
FIG. 6 demonstrates assembly 10 of FIG. 1A in a top view.
Figure 7:
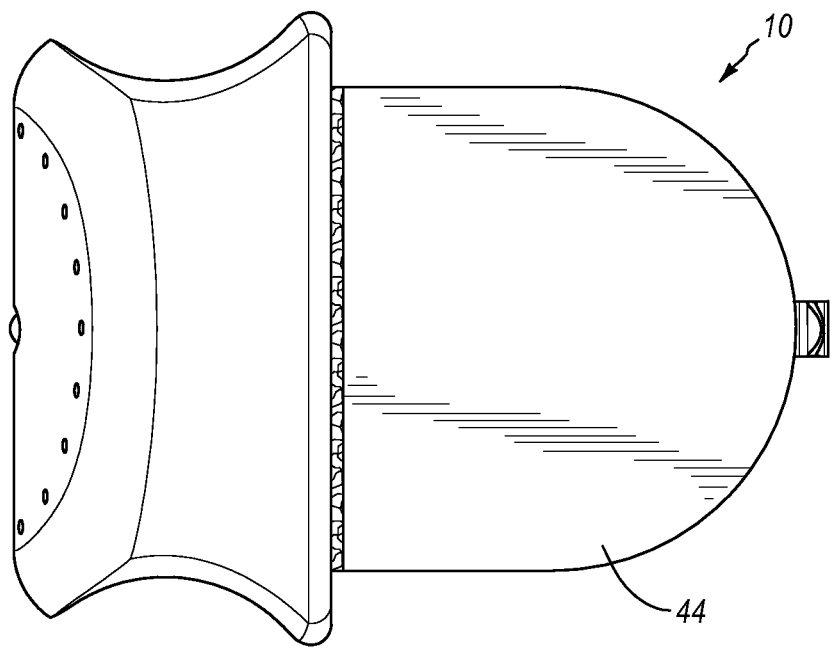
FIG. 7 demonstrates assembly 10 of FIG. 1A in a bottom view.

Plate 16 has light sources 22, e.g., light emitting diodes mounted about the peripheral surface thereof in order to attract fish toward assembly 10 where the food is and/or illuminate an aquarium. Toggle switch 26 (FIG. 3) can be used to activate light source 22 and/or rear light source 28 (FIG. 3) mounted within grip 18 which shines into a room outside the aquarium, for example. One or more batteries for light sources 22, 28 may be mounted within grip 18, for example, and electrically coupled to switch 26 and light sources 22, 28. Rather than a toggle switch 26, the switch to activate lights 22, 28 may be a rounded rotating wheel switch, one or more button switches or a variety of different switches. A remote control may optionally be used to activate light sources 22, 28.

Assembly 10 thus comprises one or more light sources 22 on the handle for illuminating the inside of the aquarium and/or rearwardly away from the aquarium. Plate 16 of the handle member 12 is greater in size than a plate 26 of the perforated container 14. One or more light sources 22 are located on the rim of the plate 16, such that the one or more lights shine past the perforated container 14 into the aquarium during use.

One or more light sources such as light source 28 and/or similar to light source 28 may be on the grip 18 for illuminating outside of the aquarium. Light source 28 may be a light emitting diode, for example.

Returning to FIG. 1, perforated container 14 comprises a substantially flat plate 26 which is configured to be mounted on the opposing side of the aquarium from handle member 12. Plate 26 has mounted thereon a brush 28, formed from bristles, cloth or other brushing material suitable for cleaning the inside surface of an aquarium panel when handle 12 is magnetically linked to container 14 is moved with respect to the aquarium.

On the opposing sides of plate 26, a curved, perforated panel 30 having apertures 50 is mounted with one side 32 of panel 30 being mounted on one end of plate 26 and an opposing side 34 of perforated panel 30 being mounted on the other end of plate 26, with panel 30 spaced from plate 26, thereby forming a cage for receiving fish food, as shown. Perforated panel 30 comprises a top non-perforated soaking shield 35 and a bottom non-perforated soaking shield 42 with perforations 50 positioned between top shield 35 and bottom shield 42. A tab member 36 is mounted at a top end of soaking shield 35 on a central edge thereof. Adjacent the top edges of panel 30, a lid 38 is movably connected to plate 26.

A clasp 40 is mounted on lid 38 so as to selectively lock lid 38 in a closed position when clasp 40 is closed against tab 36 when lid 36 is selectively, pivotally moved into a closed position, thereby selectively maintaining food within perforated container 14 except when the food exits through perforations 50. Soaking shields 35, 42 are used to retain floating or sinking food, respectively, within container 14 until the food is wet enough to disintegrate and float through openings 50. Mounted below perforated panel 30 is a floor panel 44.

As further shown in FIG. 1, container 14 includes in the perforated panel 30 thereof openings 50 that allow fish food to be dispersed therefrom in a liquid environment. In the event that a user desires to employ on a selective basis smaller openings in order to capture and selectively release less or smaller fish food in a particular instance, a supplemental cage 52 can be placed within perforated container 14, such metal cage 52 having smaller openings 54 in the cage body 56 thereof. Cage body 56 also has a hinged lid 58 in order to retain food within supplemental cage 52 that is too large to fit through openings 54. Lid 58 can be locked against body 56 with a wire, for example, or other locking mechanism or can be compressed closed by lid 38, for example.

Figure 1A:
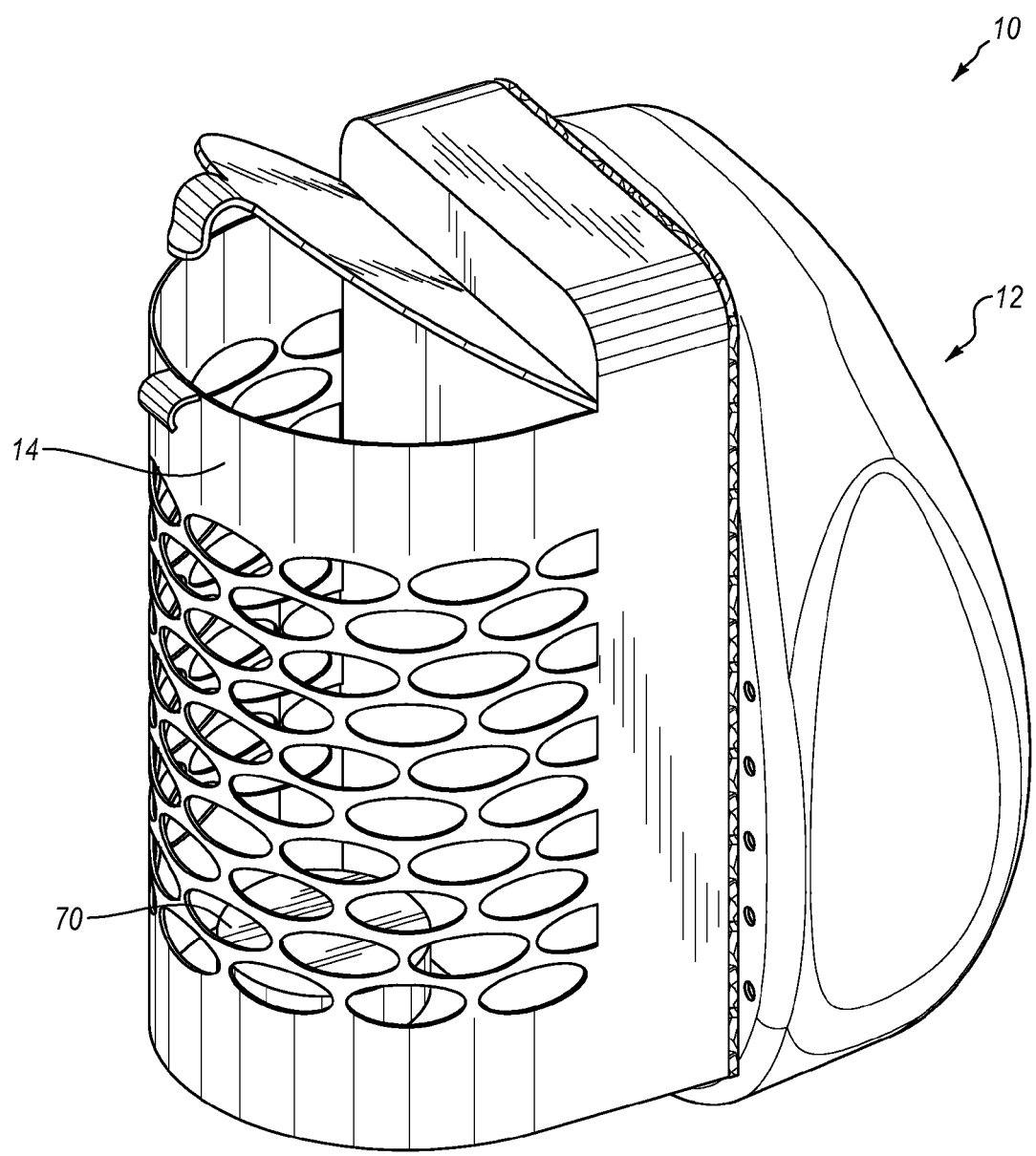
FIG. 1A demonstrates fish food dispensing assembly 10 in a magnetically coupled, perspective view without the supplemental cage 52 of FIG. 1.

In one embodiment, plates 16, 26 of handle member 12 and container 14, respectively, contain corresponding magnets with opposing polar relationships such that when handle member 12 and perforated container 14 are in close enough proximity to each other, they become magnetically coupled to each other in a desired aligned relationship, as shown for example, in FIG. 1A.

Figure 8:
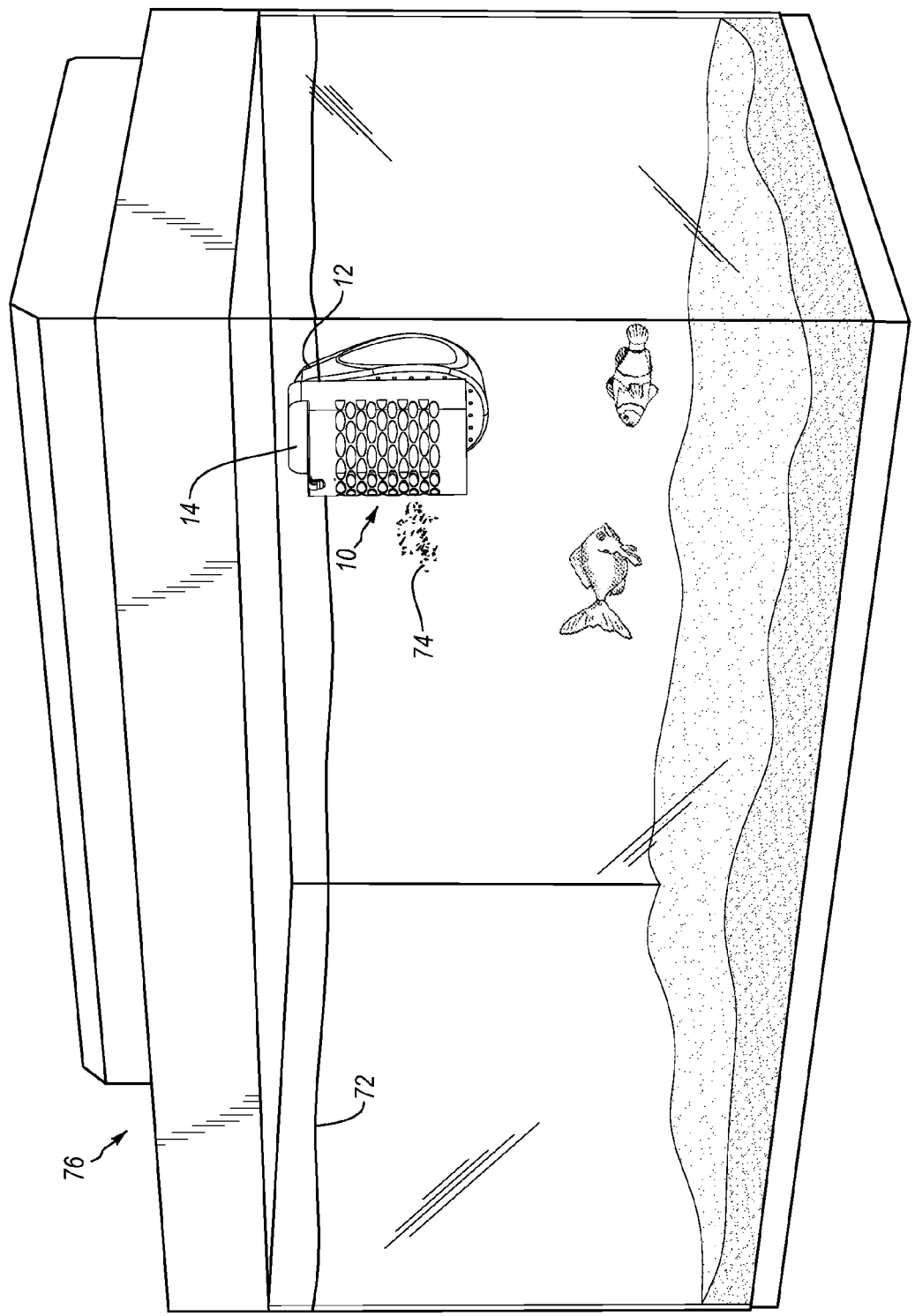
FIG. 8 demonstrates use of fish food dispensing assembly 10 mounted on an aquarium with the handle member and perforated portion magnetically linked to each other through a panel of the aquarium. Dispensing assembly 10 is shown in a vertical position with respect to the aquarium.

When handle 12 is placed on one side of a panel (e.g., glass or plastic transparent panel) of an aquarium and perforated container 14 is placed on an opposing side of the panel adjacent handle 12, a magnetic linkage occurs such that handle 12 and container 14 are magnetically linked to each other and to the panel adjacent to each other with handle 12 on one side and container 14 on the other. Then, upon moving handle 12, container 14 moves in the same direction as handle 12. Thus, when container 14 is placed inside an aquarium and handle 12 is placed outside the aquarium adjacent container 14, as shown in FIG. 8, brushing surface 28 of container 14 is positioned against the inside of an aquarium panel and shining surface 20 handle 12 is positioned against the outside of the panel, such that movement of handle 12 magnetically linked to the container 14 will operate to brush and clean the inside of the panel and shine the outside of the aquarium panel. Wherever the handle 12 is moved, the container 14 follows such that convenient brushing, cleaning, and shining takes place.

As shown in FIG. 1A, a fish food pellet 70 can be placed within perforated container. Upon placement of fish food pellet 70 in container 14, lid 38 of assembly 10 can be closed and assembly 10 can be moved to a desired location within an aquarium. By positioning assembly 10 into a desired location with respect to the aquarium, fish food pellet 70 can thus be selectively positioned within the aquarium so as to feed at a desired location within the aquarium.

For example, if it is desired to feed in a left lower corner, assembly 10 can be moved to that location without the user's hands touching the liquid such that the fish food pellet 70 can be specifically located there for bottom-feeding fish, for example. Or, if it is desired to place the container in an upper portion for top-feeding fish, assembly 10 containing pellet 70 can be moved to that location by moving handle 12 to that location, which will correspondingly drag container 14 to that desired location.

As shown in FIG. 8, for example, assembly 10 is mounted in a vertical position near the top of the aquarium adjacent water level 72. Disintegrated portions 74 of pellet 70 are shown in FIG. 8 as being released within aquarium in a desired location. If it is desired to feed fish at a lower location e.g. for bottom feeding fish, assembly 10 can be moved to the lower location, for example, by moving handle 12 magnetically coupled to perforated container 14. This simultaneously moves assembly 10 to a desired location and corresponding cleans the aquarium during such movement.

In yet another embodiment, the cleaning and feeding operations can be performed separately. For example, in one embodiment, assembly 10 is mounted on the aquarium with container 14 on the inside and without any food therein, after which the assembly 10 is moved with respect to the aquarium, thereby cleaning the aquarium. Next, assembly 10 is removed from the aquarium, or moved adjacent the water level, as shown in FIG. 8, after which food is placed therein. Assembly 10 is then allowed to feed the fish or is moved into a certain desired position for feeding fish.

By placing fish food within perforated container 14 and releasing it through perforations 50 of container 14, the fish food can be dispersed incrementally, preventing the fish from biting and swallowing large chunks of food or fish pellets which may have sharp edges and which may be too large for a fish's mouth or stomach. Food dispersed from container 14 cannot be larger than perforations 50. By thus requiring the fish food to disperse through certain sized apertures 50 by the dissolving power of the liquid water, the fish food size can be controlled so as to be dispersed in small enough chunks that are more amenable to fish's eating habits and less damaging to the fish's mouth and intestinal system.

Figure 9:
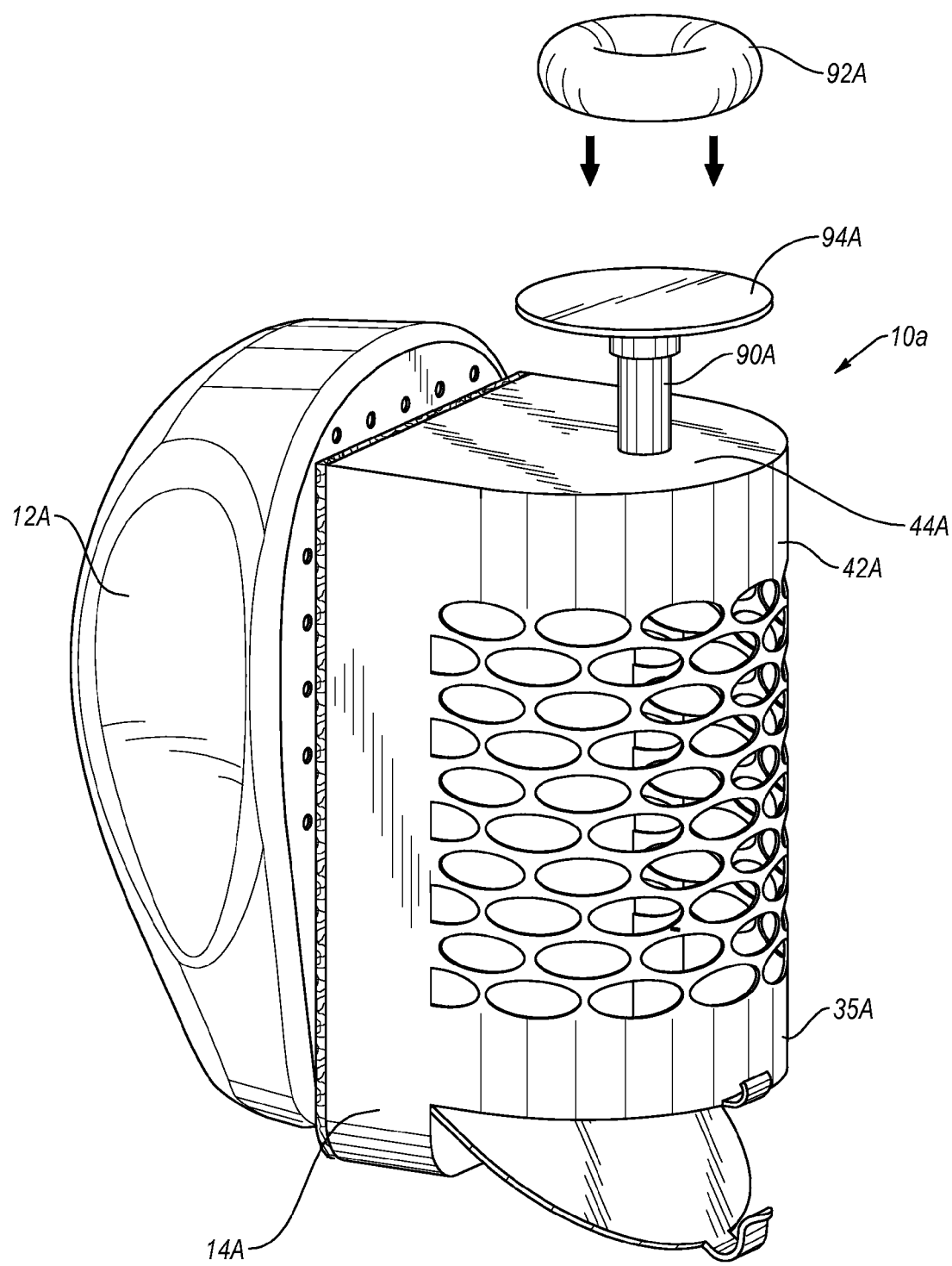
FIG. 9 demonstrates an alternative fish food dispensing assembly of the present assembly having a cylindrical fish food mounting post mounted on a bottom plate thereof.
Figure 10:
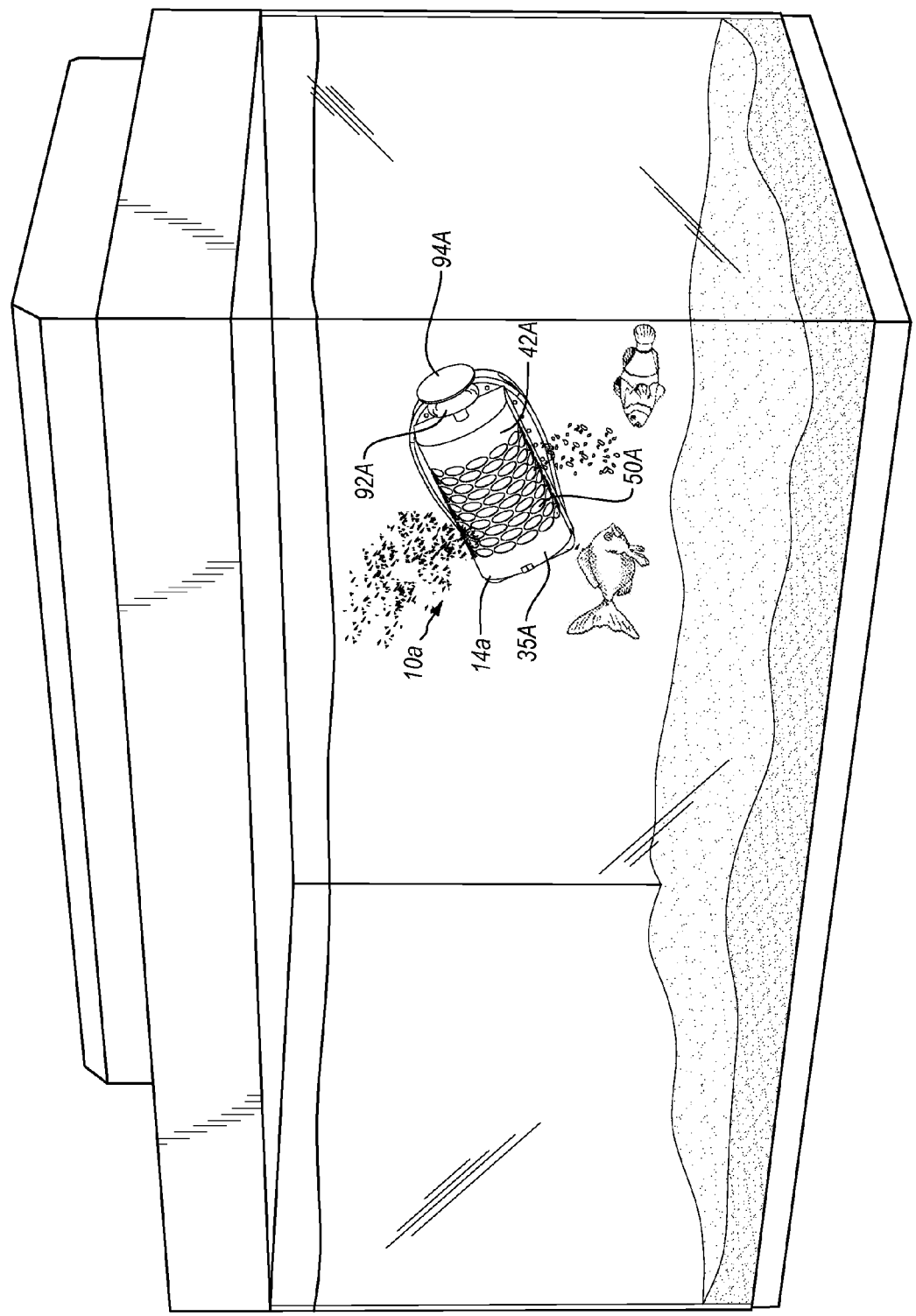
FIG. 10 demonstrates the fish food dispensing assembly of FIG. 9 mounted through magnetic linking on a panel of an aquarium. Dispensing assembly 10A is shown in FIG. 10 in a slanted position with respect to the aquarium.

With reference now to FIG. 9 in yet another embodiment, a mounting post 90A can be mounted in the floor panel 44A of a container 14A, which may be the same or similar to container 14, for example, in order to provide an opportunity to move a perforated or doughnut shaped fish food pellet 92A or other object into a desired location within the aquarium as reflected in FIG. 10. In such a manner, the pelletized food 92*a* is disbursed in a selected location. In addition, use of post 90A enables a user to introduce food, e.g. a perforated pellet 92A into an aquarium filled with water without getting the user's hands wet, among other benefits. Post 90A can be used to hold any object having a hole there through, such as a seaweed clipper, for example, which can be readily moved around the aquarium by being mounted on post 90A. Lid 94*a* can be used to maintain pellet 92*a* on post and may be selectively, threaded or press fit coupled to post, for example.

By moving container 10 or 10A to a desired location and disbursing food as desired, it is possible to more specifically place food into a more desired location as opposed to randomly placing the food. After installing pellet 92A onto post 90A, container 14A is readily moved into the water, without requiring the user to get the user's hands wet.

One exemplary method of feeding fish, which can be accomplished through the use of assembly 10 and/or assembly 10A, for example, is to initially place food, e.g. food pellet 70 (see FIG. 1A) within container 14, and closing lid 38, such that pellet 70 is partially shielded from dispersal in the water by either lower soaking plate 42 (in the case of sinking food, which will sink to the bottom of container 14) or upper soaking plate 35 (in the case of floating food, e.g., frozen food, which will float to the top of container 14), then mounting container 14 in a vertical position within water held within an aquarium such that container 14 and handle 12 are magnetically linked to each other with a panel of aquarium there between, such as shown in FIG. 8. While in the vertical position of FIG. 8, water within the aquarium will soften the food pellet 70 or a chunk or other portion of food and cause it to begin to disintegrate, but plate 42 or 35 will at least somewhat prevent the food from seeping out of container 14 into the water.

Then, upon moving handle from the vertical position of FIG. 8, for example, by turning the handle 12 in a clock-wise direction, e.g., about 235 degrees from the vertical position, container 14 (or 14A) is in a slanted position, such that floating food initially located in the top floats out of perforations 50 and sinking food initially located in the bottom likewise floats out of perforations 50. This slanted position is shown with respect to assembly 14A in FIG. 10, which is positioned about 235 degrees from the original vertical position, rotated clockwise.

One benefit of such approximately 235 degree or 225 degree rotation, for example, is that floating food initially located adjacent top panel 35 is then positioned at the bottom of the perforated container 14 and floats upwards through holes 50 and sinking food initially at the bottom of the perforated container 14 adjacent bottom panel 42 is then positioned at the top of the perforated container 14 and sinks downward through holes 50. However, any amount of rotating movement of assembly 10 from the vertical position of FIG. 8 to a slanted position that causes more food to be released through the perforations 50 can be sufficient to enhance the dispersal of food to the fish.

With reference to FIGS. 9 and 10, prior to rotating handle 12A, and therefore container 14A, food within container 14A is protected by top plate 35A and/or bottom plate 42A and is allowed to soak within water within the aquarium, thereby softening the food and preparing it for dispersal through perforations 50A. Upon rotating container 14A into the slanted position of FIG. 10, food that is shielded from dispersal by plate 35A or 42A will be begin to move, e.g., through sinking or floating, through the holes 50A as shown in FIG. 10. Thus, upon achieving the slanted position of FIG. 10, food which is now disintegrated and moistened and ready to be eaten in a more healthy manner within the sensitive mouths of fish will float out of holes 50A to be readily eaten by fish, as opposed to hardened food which has not moistened before being eaten.

The size of holes 50A also prevents fish from eating food that is bigger than the size of holes 50A, as opposed to allowing the fish to randomly eat food that is too large and may injure the mouths of the fish. Thus, after softening the food through placement in water and after rotation of container 14*a* to the slanted position of FIG. 10, softened food previously held in the areas adjacent shield 35 and/or shield 42 will move through the liquid out of apertures 50*a* for safe eating by fish.

Assemblies 10, 10A can be selectively moved vertically, horizontally and/or rotatably with respect to the aquarium. Optionally, dispensing assemblies 10 and/or 10A may also be turned on its side so that the fish can readily eat from assembly while in a horizontal orientation.

FIG. 11A shows that plate 26 of container 14 contains, in the interior thereof, one or more magnets. Specifically, magnets 100, 102 are located within outer casing 104 of plate 26. Also within casing 104 of plate 26 is a buoyant foam material 106 in sufficient quantity such that container 14 is buoyant and floats in water. Foam material 106 may be a buoyant closed cell extruded polystyrene foam, such as STYROFOAM, for example. Casing 104 of plate 26 may also be airtight in order to increase the buoyant effect of container 14 and cause it to float, but in our embodiment, foam 106 is buoyant enough to cause floatation of container 14 without casing 104 being airtight. This enables flotation even in the event of a perforation.

This floating effect allows a user to grab floating container 14, if it becomes magnetically disengaged from handle 12, without getting the user's hands wet. Thus, upon disconnection from a magnetic linkage, such as by accidentally dropping container 14 in an aquarium, container 14 readily floats, enabling a user to pull it from the water without having to place the user's hand into the bottom of a wet aquarium.

At least one of the handle member and the perforated container have a magnet therein that magnetically attracts the handle member and the perforated container to each other. In one embodiment each of the handle member and the perforated container have one or more magnets therein for accomplishing the desired attraction and relationship.

In one embodiment, magnets 100, 102 are oriented with opposite poles on the same side, such that magnet 100 has a north side against foam 106 for example, while magnet 102 has a south side against foam 106, for example. By orienting opposite poles of magnets on the same side of handle 12 in an offsetting relationship, one can enable handle 12 and container 14 to readily align and couple to each other in a desired relationship, such as shown in FIG. 1A, for example, for convenient storage, transportation, and sale.

Magnets 100, 102 may be embedded within the foam 106. Optionally, FIG. 11B shows that foam 106B, which causes container 10B to float, may be in panels of foam within casing 104B.

Advantages of assembly 10 thus include the following: Assembly 10 acts as a useful feeder to feed fish in a calculated, positionable manner without getting a user's hands wet. Assembly 10 simultaneously provides lighting to the interior of an aquarium and/or to a room. Assembly 10 provides the ability to simultaneously clean the inside and outside of the aquarium. Assembly 10 also provides a holder for holding a pellet of food or other object and for positioning the pellet or object in a liquid-filled aquarium without getting the hands of a user wet during such positioning. Assembly 10 acts as a soaker for soaking the food prior to feeding to fish, thus making the food soft and protecting the delicate lining surfaces of a fish's mouth and gastrointestinal tract from the sharp, hard edges of un-moistened food.

Food that is not eaten by the fish can be readily removed from the aquarium if desired by removing container 14 in a magnetically linked vertical motion without requiring the user to place the user's hand in the water. Floating and/or sinking food is trapped inside container 14 until the food either dissolves and moves through perforations 50 or is taken out of the fish aquarium for storage and feeding at a later time. This can prevent overfeeding and can save food that has not moved through perforations for later use.

Fish food in container 14 is allowed to expand in a liquid in a container and disintegrates before it is eaten by the fish, thereby preventing post-eating water expansion within a fish's stomach, which can damage the stomach. After the food is moist and soft, it is easier for the fish to digest and will assist in preventing overeating by the fish because the fish will eat the food while it is wet and expanded. By eating wetter, expanded food, the fish has decreased tendency to overeat. The food can be selectively placed at any height along a container, e.g. an aquarium. Floating food can be prevented by going out the top of the cage and can be kept centrally or lower in the cage as desired. Finally, food sizes are regulated by the sizes of the perforations of the cage(s), which can be selected by the user.

The assembly 10 of the present invention and similar assemblies may be used in connection with any type of container used to hold water. Thus, assembly 10 may be used in a personal, home, agricultural, retail, commercial, industrial application or a variety other types of settings. The aquarium mentioned and claimed herein may be any type of container that holds a liquid, such as water.

As yet another feature of the invention, an elongate extension handle 53a (shown in phantom lines in FIG. 1), such as a broom handle having threads on a tip thereof, may be selectively connected to handle 12 so as to move handle 12 when assembly 10 is located away from the user, such as when an aquarium is on a high shelf or otherwise located to far from the user to reach handling 12 without the use of an extension handle 53a. In one embodiment, extension handle 53a is selectively, threadedly connected to handle 12 or press fit therein or attached thereto with an adhesive.

FIG. 12 shows another example of a lid 38a movably coupled to the plate of a perforated container of the present invention.

Figure 13:
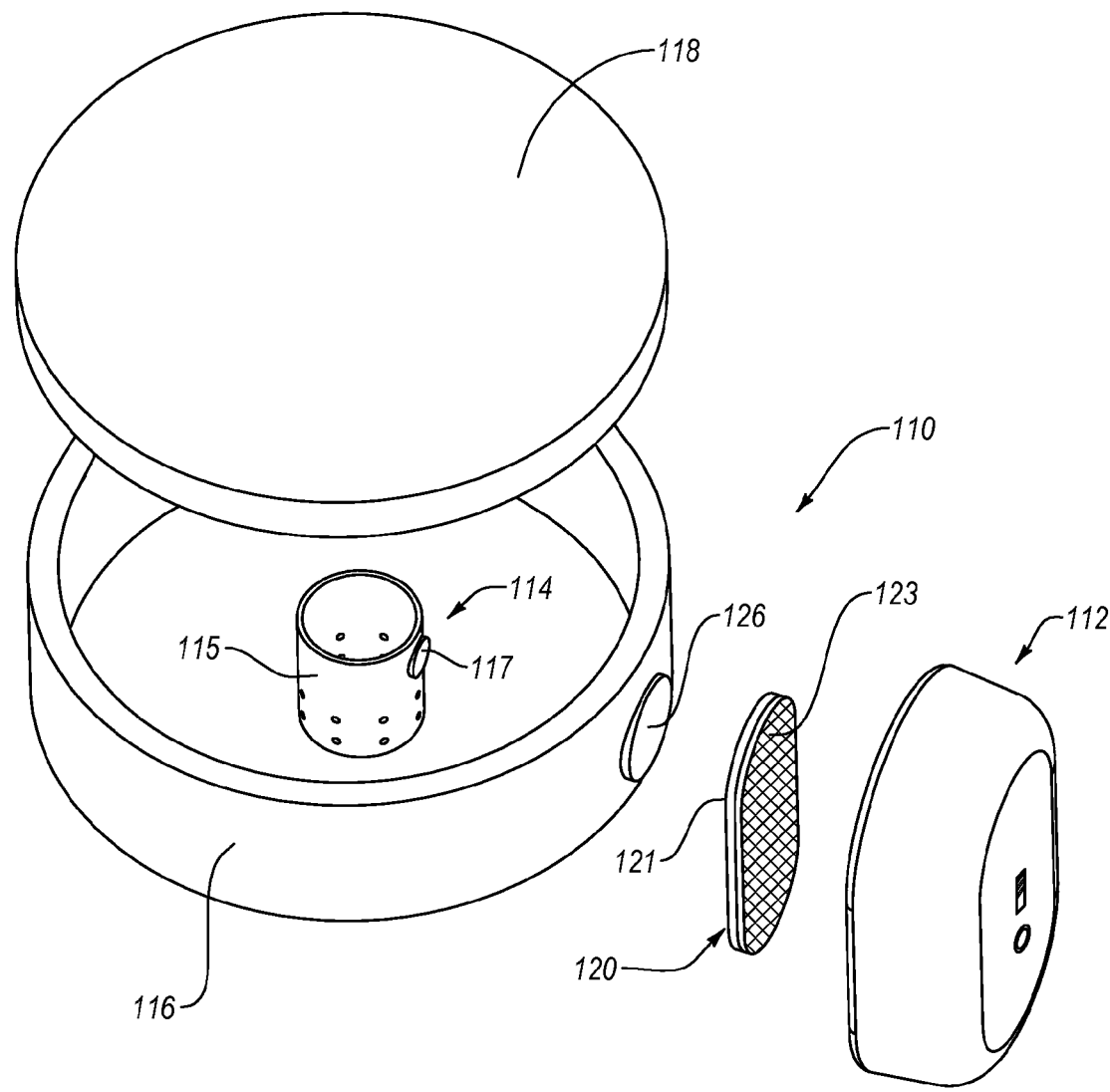
FIG. 13 demonstrates another embodiment of a fish food dispensing assembly 110 of the present invention, assembly 110 being shown in an exploded view.

FIG. 13 demonstrates an alternative fish food dispensing assembly 110 of the present invention comprising a handle member 112 and a perforated container 114 that are configured to be selectively, magnetically linked to each other while on opposite sides of the panel of a fish aquarium in order to clean and/or dispense food from perforated container 114 in a liquid environment (such as water). In light of the magnetic linkage, the position of container 114 can be selectively moved when moving handle member 112. Liquid within the aquarium moistens fish food within the perforated container 114 and moves the fish food out of perforations in the perforated container 114. Upon movement of handle member 112, dispensing assembly 110 moves to a selected location within an aquarium.

Figure 14:
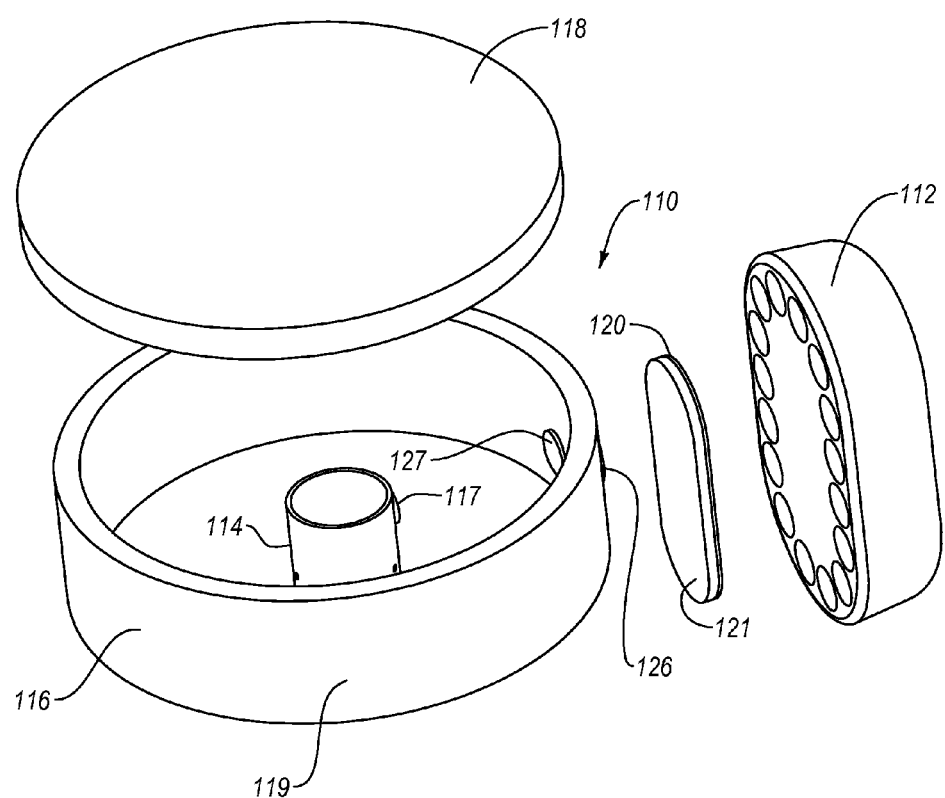
FIG. 14 demonstrates the fish food dispensing assembly 110 in an alternate perspective view.

Handle member 112 can be exactly the same as or similar to previous handle members disclosed herein, such as handle member 12 of FIGS. 1-8, for example, handle member 12a of FIG. 9 and other handle members described herein. Thus, handle member 112 can have one or more magnets therein, for example, and further has an array of lights (or multiple arrays of lights), comprising light emitting diodes, such as discussed with respect to handle 12, for example. The LED lights of handle member 112 thus can provide one or more colors within an aquarium, illuminating fish or objects within the aquarium. In one embodiment, the one or more light emitting diodes of handle member 112 emit different colors of light, thereby illuminating the aquarium with different colors. Handle member 112 may have various lighting arrays, including a series of LEDs around the peripheral plate surface thereof, as shown in FIG. 14 and/or a variety of other arrays as may be desired to illuminate the interior of the container.

Dispensing assembly 110 further comprises: (i) a fish food containment ring 116 configured to be magnetically linked to perforated container 114 with container 114 inside ring 116; (ii) a lid 118 which can be mounted on ring 116, and (iii) a brush plate 120 which is selectively magnetically linked to handle member 112 on an opposite side of an aquarium panel from handle member 112, and which is also selectively magnetically linked to fish food containment ring 116, both of which are inside the aquarium. These relationships are also demonstrated in FIG. 14. In light of the magnetically linked relationships of the components of assembly 110, upon movement of handle member 112, dispensing assembly 110 moves to a selected location within an aquarium.

Perforated container 114 is a cage-member comprised of a perforated container body 115 and a magnet 117 mounted on the container body 115. Perforated container 114 may comprise a cup or vessel having an outer cylindrical wall and a lower plate, the wall and/or plate having perforations therein such that food can be placed within container 14 and soaked by liquid and/or exit the perforations in the presence of water or another liquid. Perforated container 114 is configured to be magnetically linked to containment ring 116 within containment ring 116 such that food dispensed from container 114 is maintained within ring 116. Ring 116 can be moved to a selected location of the aquarium by moving handle 112 to that location.

Figure 15:
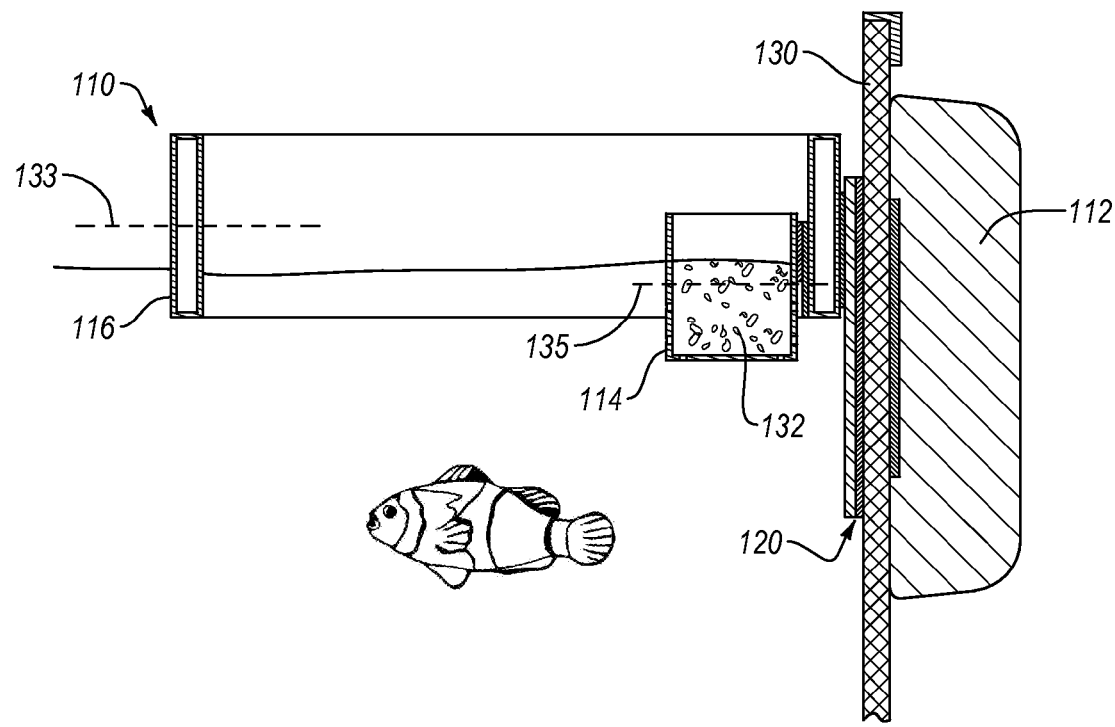
FIG. 15 shows an assembled view of fish food dispensing assembly 110 in use in an aquarium wherein food has been placed in a perforated container within a fish food containment ring of the assembly, enabling the food to be soaked by liquid within the container.

In the embodiments of FIGS. 13 and 15, a majority or all of the mass of magnet 117 of perforated container 114 is positioned on an upper portion of container body 115 (i.e., above a midpoint 135 of container body 115) to help ensure that a substantial portion of perforated container 114 is located below the water level while ring 116 floats in a position such that ring 116 contains fish food within ring 116. This positioning of the magnet 117 encourages the lower portion of the container body 115 to be positioned below the water level when the container 114 is magnetically coupled to ring 116 while inside ring 116.

Brush plate 120 is comprised of (i) a plate member 121, comprising a material (e.g., metallic) that is attracted to magnets; and (ii) a brush 123 mounted on plate member 121 so as to brush the interior of a panel of an aquarium. Brush 123, may be formed from bristles, cloth or other brushing material suitable for cleaning the inside surface of an aquarium panel when handle 112 is magnetically linked to plate 120 and handle 112 is moved with respect to the aquarium. The brush plate 120 is comprised of a material that is attracted to one or more magnets in handle 112 and ring 116, such that plate 120 can be selectively magnetically linked to containment ring 116 and such that plate 120 can be simultaneously selectively magnetically linked on opposing sides of a panel of the aquarium to handle member 112 with the aquarium panel between the handle member 112 and the brush plate 120.

Containment ring 116 is in one embodiment configured to float, such as by being formed as a hollow plastic ring or by otherwise being configured so as to float, e.g., by containing STYROFOAM or another floating material. Floating containment ring 116 assists to orient brush plate 120 in a substantially vertical position near the top of the liquid within aquarium 130. Containment ring 116 of the present invention is preferably made from a floating material, e.g., by the ring being comprised of a hollow material or other floating material that causes the ring to float within the aquarium 130.

Containment ring 116 comprises a ring shaped member having a large aperture therethrough and having a magnet 126 thereon for magnetic linking to brush plate 120. In one embodiment, magnet 126 is coupled directly to an outside portion of ring shaped body 119 of ring 116 while another magnet 127 is coupled to an inside portion of body 119. In another embodiment, magnets 126 and 127 are integrally connected to each other and extend through body 119. Thus either a single magnet extending through body 119 or multiple magnets on opposing sides of body 119 can be employed. Lid 118 may be comprised of a plate with a rim on the edge thereof such that the rim mounts the plate onto the containment ring 116.

Figure 19:
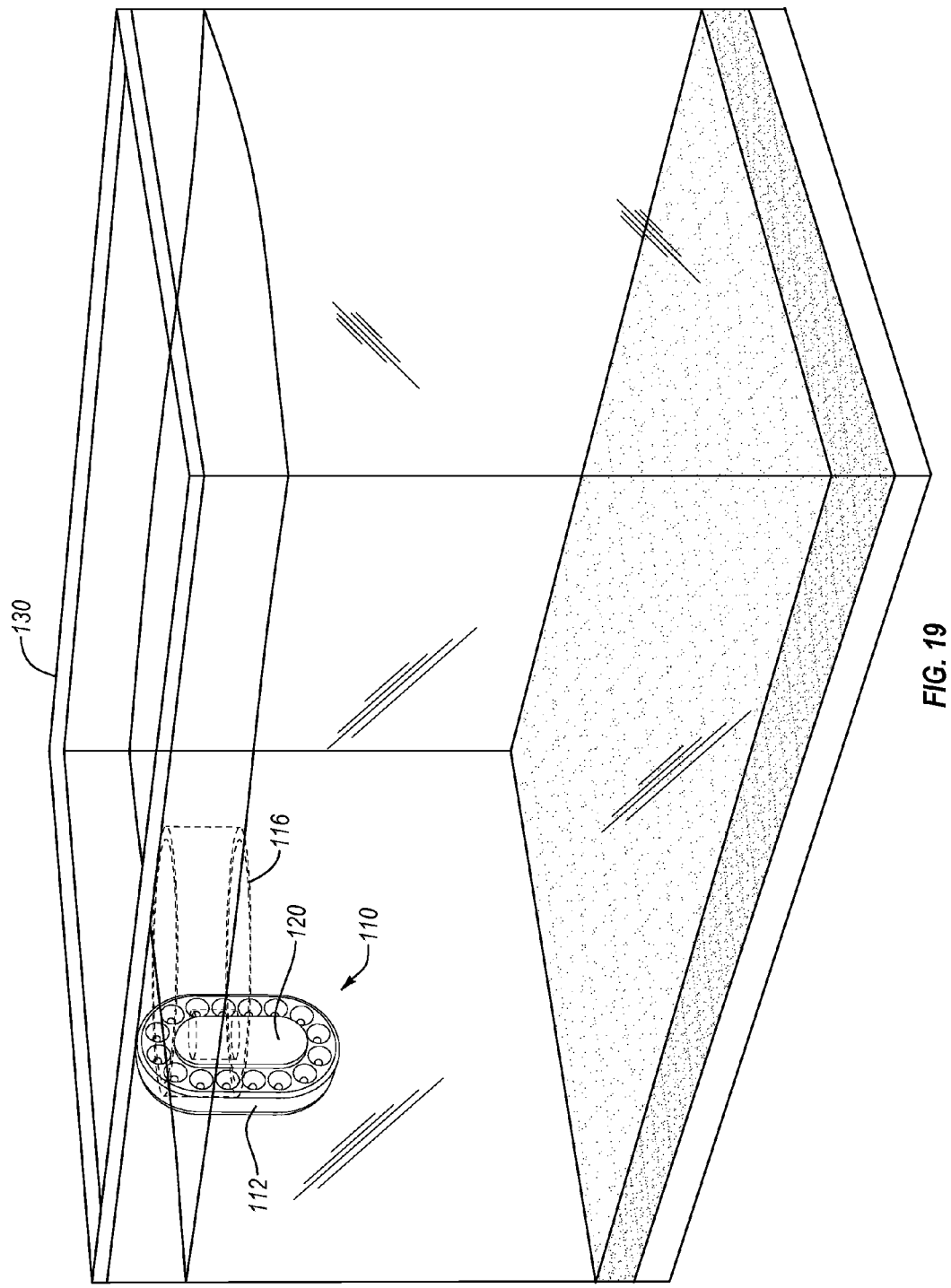
FIG. 19 demonstrates fish food dispensing assembly 110 mounted to aquarium 130.

In one embodiment, the outer magnet 126 of ring 116 is oriented such that a magnetic attraction between ring 116 and brush plate 120 orients brush plate 120 in a substantially vertical position near the top of the liquid in aquarium 130 as shown in FIGS. 15 and 19. In this substantially vertical position, brush plate 120 can be conveniently substantially parallel and aligned with handle 112, such that brush plate 120 is conveniently, selectively, magnetically linked to handle 112 adjacent the top of the liquid in aquarium 130. The poles of the magnets in handle member 112 and/or ring 116 are positioned such that the respective handle, 112, brush plate 120, and ring 116 conveniently align with each other in an orientation in which plate 120 and handle 112 are substantially vertical and substantially parallel to each other, as shown in FIGS. 13, 14, 15, and 19 for example.

Inner magnet 117 of perforated container 114 is also configured such that container 114 is upright, as shown in FIG. 13. Thus, floating ring 116 makes the scrub plate 120 substantially parallel and convenient for magnetic linking with handle 112 and container 114.

To help orient ring 116 in a food containing position (as shown in FIG. 13), inner magnet 126 and outer magnet 127 (which may be separate or integrally connected) of ring 116 are mounted on ring body 119 such that a majority or all of the mass of inner magnet 126 and outer magnet 127 are positioned below the midpoint 133 of the ring body 119 when ring body 119 is viewed in cross section, as shown in FIG. 15. Thus, a majority or all of the mass of inner magnet 126 and outer magnet 127 are positioned on a lower portion of ring body 119. This weighting providing by locating a majority or all of the mass of magnets 126, 127 substantially below the midpoint 133 of ring body 119 orients both brush plate 120 and perforated container 114 substantially below the midpoint 133 of ring body 119, as shown in FIG. 15, thereby enabling a substantial portion of perforated container 114 to be located below the water level while ring 116 floats in a food containing position, also as shown in FIG. 15.

As shown in FIGS. 13 and 15, inner magnet 126 and outer magnet 127 (which may be separate or integrally connected) of ring 116 are mounted on ring body 119 such that more of the mass of inner magnet 126 and more of the mass of outer magnet 127 is positioned below the midpoint 133 of the ring body 119 (when ring body 119 is viewed in cross section, as shown in FIG. 15) than is positioned above the midpoint 133 of the ring body 119. Positioning the majority of the mass of magnets 126, 127 below the midpoint 133 of ring body 119 helps to insure that a substantial portion of perforated container 114 is located below the water level while ring 116 floats in a food containing position as shown in FIG. 15.

Similarly, as shown in FIGS. 13 and 15 a majority or all of the mass of magnet 117 of perforated container 114 is positioned above a midpoint 135 of perforated container 114 to further enable a substantial portion of perforated container 114 to be located below the water level while ring 116 floats in a food containing position as shown in FIG. 15.

In one embodiment, brush plate 120 is not employed, but rather containment ring 116 is directly magnetically selectively linked to handle 112. Thus, brush plate 120 can be employed if it is desired to brush and clean the aquarium 130, but brush plate 120 need not be employed if it is desired to simply magnetically link containment ring 116 to handle 112. In yet another embodiment, brush plate 120 is integrally connected to containment ring 116, such that containment ring 116 includes a brush thereon.

Perforated container 114, containment ring 116, and brush plate 120 are placed within liquid in an aquarium 130, as shown in FIG. 15, and fish food 132 is placed within perforated container 114 and allowed to soak within the liquid in aquarium 130. Floating fish food will also float upward out of container 114, but will be substantially maintained within containment ring 116, thereby substantially preventing the food from moving to all of the areas of the aquarium 130. Maintaining the fish food 132 within a designated area of the aquarium 130 helps to ensure that only a selected portion of the aquarium is affected by the untidiness and unsightly film and slime formed by fish food floating to unwanted areas of the aquarium 130. In other words, containment ring 116 contains a substantial portion of fish food 132 within a desired area of the aquarium, keeping other areas of the aquarium clean while the fish are free to eat the fish food 132.

One convenient method of magnetically linking brush plate 120 to ring 116 that is enabled by the positioning of magnets 127, 127 of ring 116 first comprises linking brush plate 120 to ring 116 with brush plate 120 oriented downwardly, such that ring 116 with the attached plate 120 float in a food containing position within aquarium 130, after which handle 112 is conveniently magnetically linked thereto. This is often more convenient than first linking brush plate 120 to handle 112, then linking ring 116 to brush plate 120 because ring 116 floats in a food containing position with plate 120 thereon and because of the increased gripping surface of the ring 116, which can be conveniently held while linking handle 112 to brush plate 120 on opposing sides of a panel of aquarium 130.

Figure 15A:
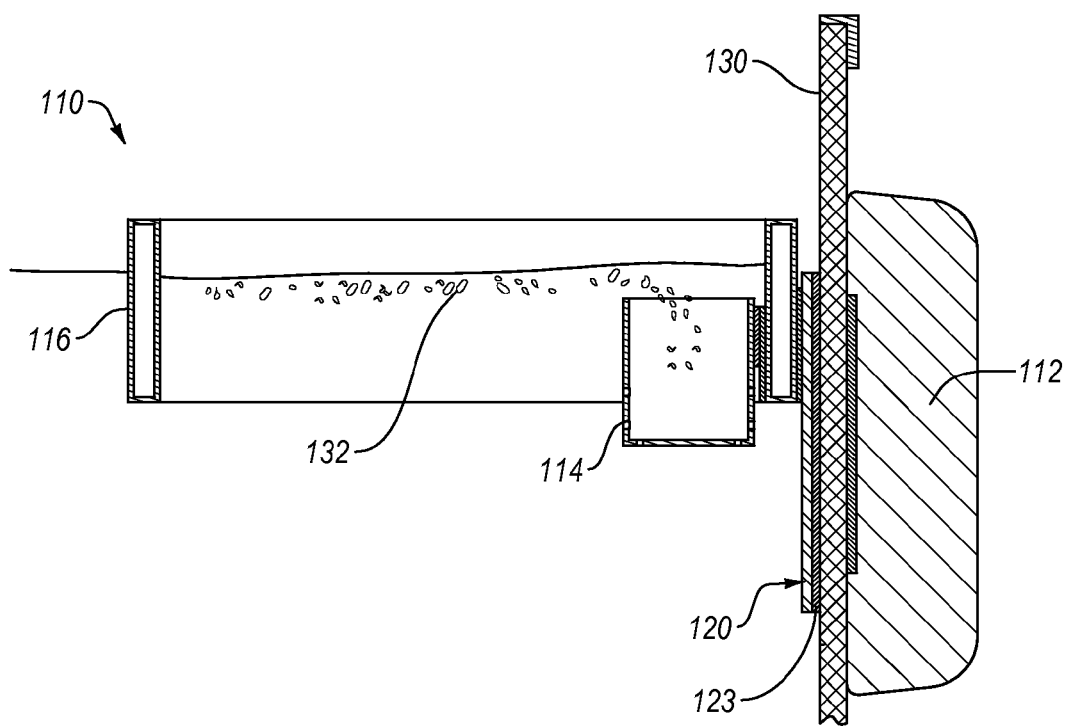
FIG. 15A illustrates the lowering of container 114 by moving handle member 112 downwardly such that container 114 and ring 116 (which are magnetically linked to handle member 112) both move lower such that container 114 extends below the water level. Floating fish food then exits container 114.
Figure 16:
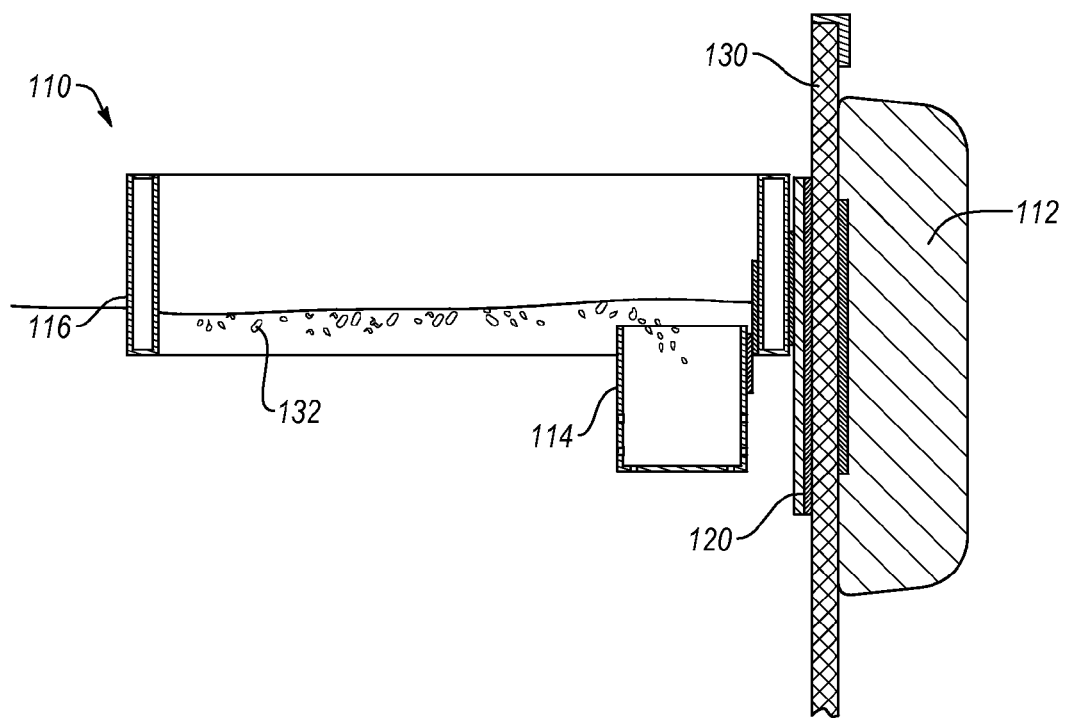
FIG. 16 demonstrates the fish food dispensing assembly 110 of FIGS. 13, 14, and 15, wherein the perforated container has been pressed further downward into the water and wherein the soaked floating food has been moved by the fluid in the aquarium from the perforated container to the top of the fluid in the aquarium.

Once floating food within container 114 is soaked, as illustrated in FIG. 15, the soaked food is less sharp for the mouths of fish and is thus better for eating by the fish. In order to completely cause the floating food to move out of container 114, container 114 can then be moved completely below the water level, as shown in FIG. 15A or FIG. 16, allowing the soaked food to float out of container 114. This lowering of container 114 can be performed by (i) moving handle member 112 downwardly such that container 114 and ring 116 both move lower such that container 114 extends below the water level, as shown in FIG. 15A; or (ii) by moving container 114 with respect to ring 116 (e.g., by manually moving container 114), as illustrated in FIG. 16.

FIG. 16 demonstrates the fish food dispensing assembly 110 of FIGS. 13, 14, and 15, wherein the perforated container has been moved further downward into the water and wherein the soaked floating food has been moved by the fluid in the aquarium from the perforated container to the top of the fluid in the aquarium. According to this method of dispensing food, floating food is first soaked in the perforated container 114 as shown in FIG. 15 (soaked food being softer and therefore better for the mouths of the fish), then the perforated container 114 is moved further into the liquid such that the floating food exists the top of the perforated container, as illustrated in FIG. 16. Optionally, as illustrated in FIG. 15A, once assembly 110 is in the position of FIG. 15, after the food 132 is soaked, the entire assembly 110 can be moved downward by moving handle 112, such that perforated container 114 is moved completely below the water level, and such that soaked floating food 132 will float out of the top of container 114.

As illustrated in FIG. 16, containment ring contains floating fish food 132 in a selected position within aquarium 130, substantially preventing the fish food 132 from moving to unselected, random locations of the aquarium 130 and substantially ensuring that the areas where the containment ring is not located, are less likely to become dirty or soiled or receive a film of fish food thereon.

Lid 118 can optionally be placed on containment ring 116 in connection with the use of sinking fish food 132*a*, as discussed in connection with FIGS. 17 and 18.

Figure 17:
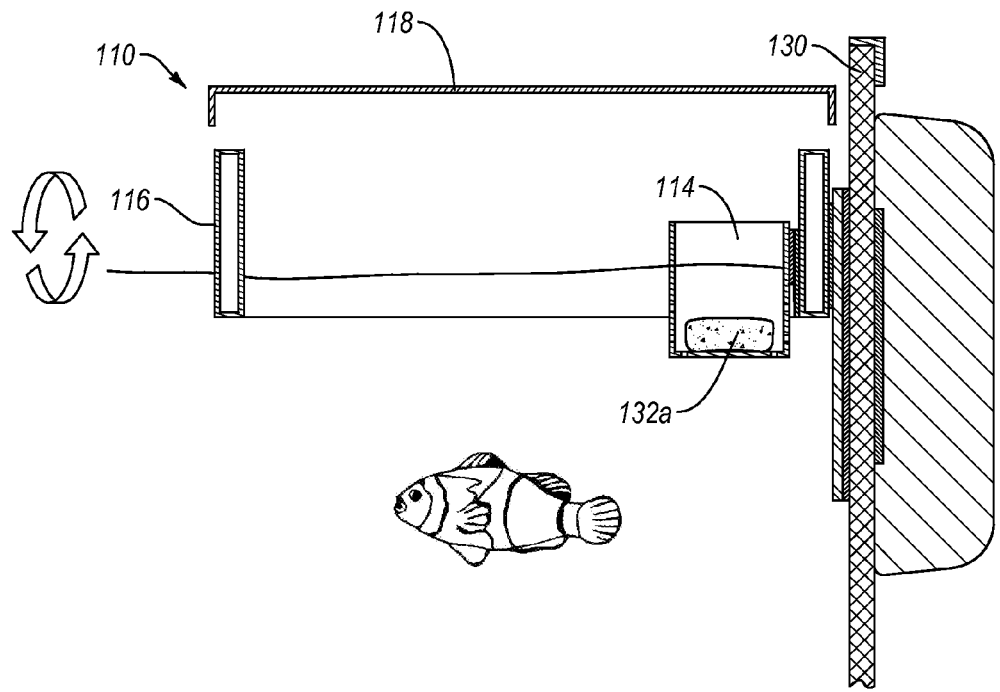
FIG. 17 demonstrates the fish food dispensing assembly 110 wherein sinking food has been placed in a perforated container within a fish food ring of the assembly and wherein a lid is being mounted on the containment ring. Arrows demonstrate that the ring with the lid therein may be conveniently inverted, i.e., turned upside down, as reflected in FIG. 18.

As illustrated in FIG. 17, assembly 110 is mounted on an aquarium 130. Once sinking food 132*a* is placed within container 114 to soak within the liquid in aquarium 130, lid 118 can then be placed on containment ring 116. Once lid 118 is placed on containment ring, ring 116 and associated lid 118, along with perforated container 114 and plate 120 can then be inverted, i.e., turned upside down, as shown in FIG. 18. Inverting ring 116, lid 118, container 114 and plate 120 can be performed by spinning handle 112 approximately 180 degrees, for example, as illustrated by the spinning arrows of FIG. 17. This causes the sinking food 132*a* to move from container 114 to the now upside down lid 118, as shown in FIG. 18. Ring 116 substantially contains sinking food 132*a* within a desired location within the aquarium, preventing the food from contaminating undesired portions of the aquarium, as further shown in FIG. 18

Thus, containment ring contains fish food, which is floating fish food 132, or sinking fish food 132*a*, in a desired position within aquarium 130, preventing the fish food from moving to random areas of the aquarium 130 and ensuring that the areas where the containment ring is not located, are less likely to become dirty or soiled or receive a film of fish food thereon.

Figure 18:
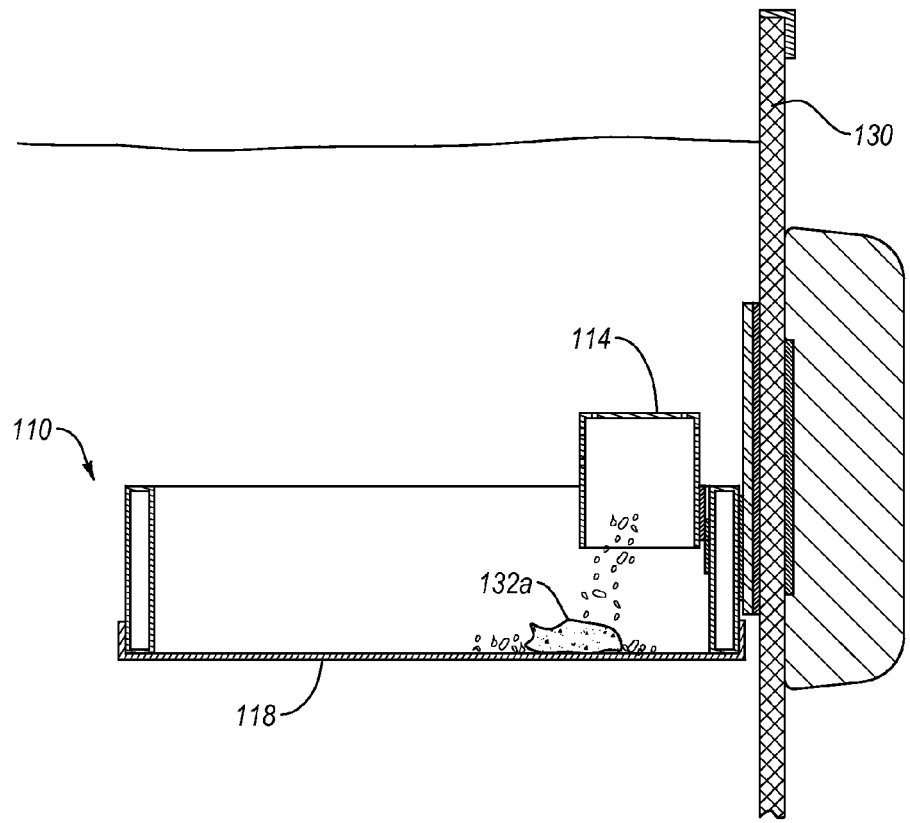
FIG. 18 demonstrates the inverted containment ring 116 and lid 118 wherein sinking food is moving from the inverted perforated container of FIG. 17 and is maintained on lid 118 for consumption by a fish.

As shown in FIGS. 17-18, lid 118 can be placed on containment ring 116, such that sinking food placed within perforated container 114 sinks to the bottom of inverted containment ring 116, landing on lid 118 and being maintained in a fixed, selected position within containment ring 116. Thus, the sinking food is held in a desired position within aquarium 130, such that other areas of the aquarium are less likely to become dirty or receive a layer of fish food thereon as an unsightly film that needs to be cleaned.

FIG. 19 demonstrates fish food dispensing assembly 110 mounted to aquarium 130. Assembly 110 is configured such that the fish food dispensing assembly 110 can be moved with respect to the aquarium 130 by moving handle 112 of FIG. 13 in order to position the fish food dispensing assembly in a selected location for feeding fish within the aquarium, such that the fish food is dispensed within the selected location, substantially preventing the fish food from extending to other locations within the aquarium.

Figure 20:
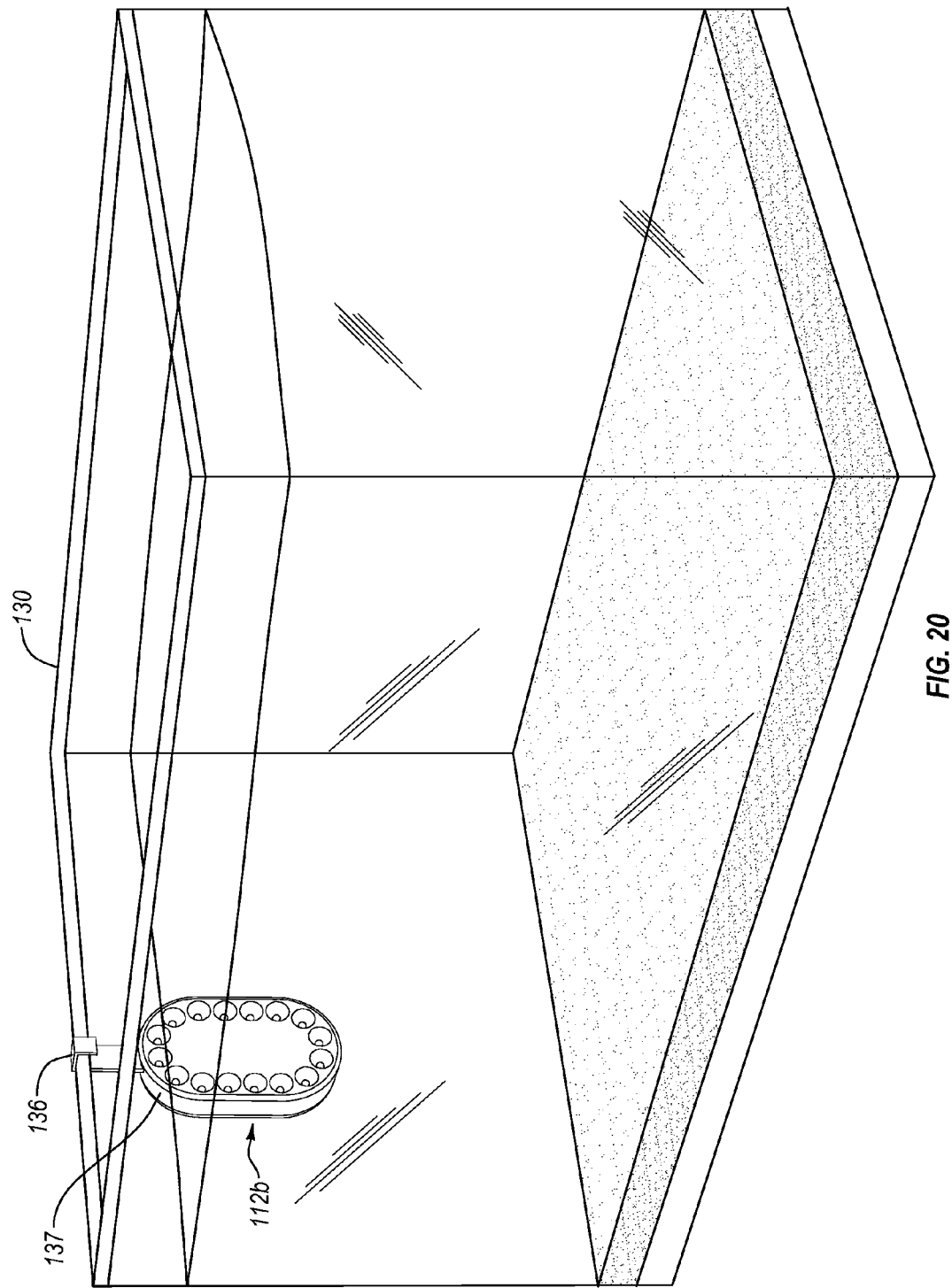
FIG. 20 demonstrates an alternative handle member 112b of the present invention wherein a hook of the handle member mounts the handle member to an aquarium to thereby illuminate the aquarium and fish and objects therein.

FIG. 20 demonstrates yet another embodiment of a fish food dispensing assembly 110*a* comprising a handle member 112*b*, having a hook 136 mounted thereon. In this embodiment, hook 136 maintains handle 112*b* on aquarium 130, while containment ring 116, brush plate 120, and perforated container 114 are selectively, magnetically linked to handle 112*b*.

FIG. 20 thus demonstrates an alternative handle member 112*b* of the present invention wherein a hook 136 of the handle member 112*b* mounts the handle member 112*b* to an aquarium to thereby illuminate the aquarium and fish and objects therein. Hook 136 is mounted on and extends from the body 137 of handle member 112*b*, as shown in FIG. 20.

Hook 136 may be mounted on any of the body portions 137 of the handle members disclosed herein to form handle member 112*b* or a similar handle member having a hook. For example, a hook 136 may be mounted on a body of handle member 12 of FIG. 1, FIG. 12A of FIG. 9, and/or handle member 112 of FIG. 13, for example to form a handle member of the present invention featuring illuminating lights that is magnetically linked to a perforated container 114 (or 14, 14A or 14B), brush plate 120, and/or containment ring 116 of the present invention. Hook may be mounted on and extend from a portion of a body of the handle member of the present invention, such as by being coupled to plate 16 or grip 18 of handle member 12 of FIG. 1, for example. Thus, in one embodiment, hook 136 is mounted on a body of handle member 12 by being coupled to plate 16 and/or grip 18 of handle member 12 of FIG. 1.

Handle 112*b* of FIG. 20, having hook, 136 may be used independently from brush plate 120, containment ring 116, and/or container 114, as illustrated in FIG. 20. Optionally, however, brush plate 120, containment ring 116, and/or container 114, are used in conjunction with handle 112*b* having hook 136. For example, in one embodiment, handle 112*b* is first mounted onto an aquarium 130 using hook 136 for illuminating aquarium 136 with one or more colors of lights, after which brush plate 120, containment ring 116, and container 114 are added to the aquarium, after which food is placed into container 114 as discussed with respect to FIGS. 15-19 for feeding fish.

Aquarium 130 and the dispensing assembly 110 of FIGS. 13-18 are an example of an aquatic assembly for creating an ecosystem for marine wildlife, the aquatic assembly comprising: (A) an aquarium 130 configured to contain a liquid therein with marine life existing within the liquid in the aquarium; and (B) a fish food dispensing assembly 110 configured to be mounted to the aquarium, the fish food dispensing assembly comprising: (i) a handle member 112 having light sources thereon for illuminating the aquarium to thereby attract fish toward the dispensing assembly; (ii) a perforated container 114 that is selectively, magnetically linked to the handle member, the perforated container 114 configured to receive fish food therein and to dispense fish food therefrom in a liquid environment, the perforated container 114 configured to be magnetically linked to the handle member 112, such that the fish food dispensing assembly 110 can be moved with respect to the aquarium 130 in order to position the fish food dispensing assembly in desired locations for feeding fish within the aquarium; (iii) a fish food containment ring 116 configured to be magnetically linked to the perforated container 114 and to the handle member 112 such that the fish food dispensed within the aquarium is dispensed within a specific location, substantially preventing the fish food from extending to other locations within the aquarium; and (iv) a brush plate 120 configured to be magnetically linked to the perforated container 114, the containment ring 116, and the handle 112, such that the brush plate moves against the aquarium panel when the dispenser assembly is moved with respect to the aquarium, wherein the fish food dispensing assembly can be employed to simultaneously dispense food to fish and to clean the panels of the aquarium.

A method for dispensing fish food within an aquarium 130 filled with a liquid, comprises: (A) providing an aquarium 130 filled with a liquid; (B) providing a perforated container 114 and a handle member 112 that are configured to be selectively, magnetically linked to each other; (C) providing a fish food containment ring 116 configured to be magnetically linked to the perforated container 114 and to the handle 112; (D) placing fish food within the perforated container; (E) placing the containment ring 116 within the aquarium; (F) placing the perforated container 114 within the containment ring 116 such that the containment ring 116 is inside the aquarium 130 and the perforated container 114 is on the inside of the containment ring 116 and such that the handle member is on the outside of the aquarium 130 such that the perforated container 114, containment ring 116, and the handle 112 are magnetically linked to each other, and such that the liquid within the aquarium 130 moistens the fish food within the perforated container 114 and moves the fish food out of perforations in the perforated container 114, and such that the fish food dispensed within the aquarium is dispensed within a specific location, substantially preventing the fish food from extending to other locations within the aquarium.

In an embodiment further comprising a lid 118 for covering the containment ring, a method for dispensing fish food further comprises: allowing fish food in the perforated container to soak in the liquid and inverting the perforated container such that food is moved onto the lid, as shown in FIGS. 17 and 18.

In an embodiment further comprising a brush plate 120 that is magnetically linked to the handle and/or the containment ring, the method for dispensing further comprising cleaning the aquarium using the brush plate. The method for dispensing can further comprise illuminating the aquarium 130 using the dispensing assembly 110.

Figure 13A:
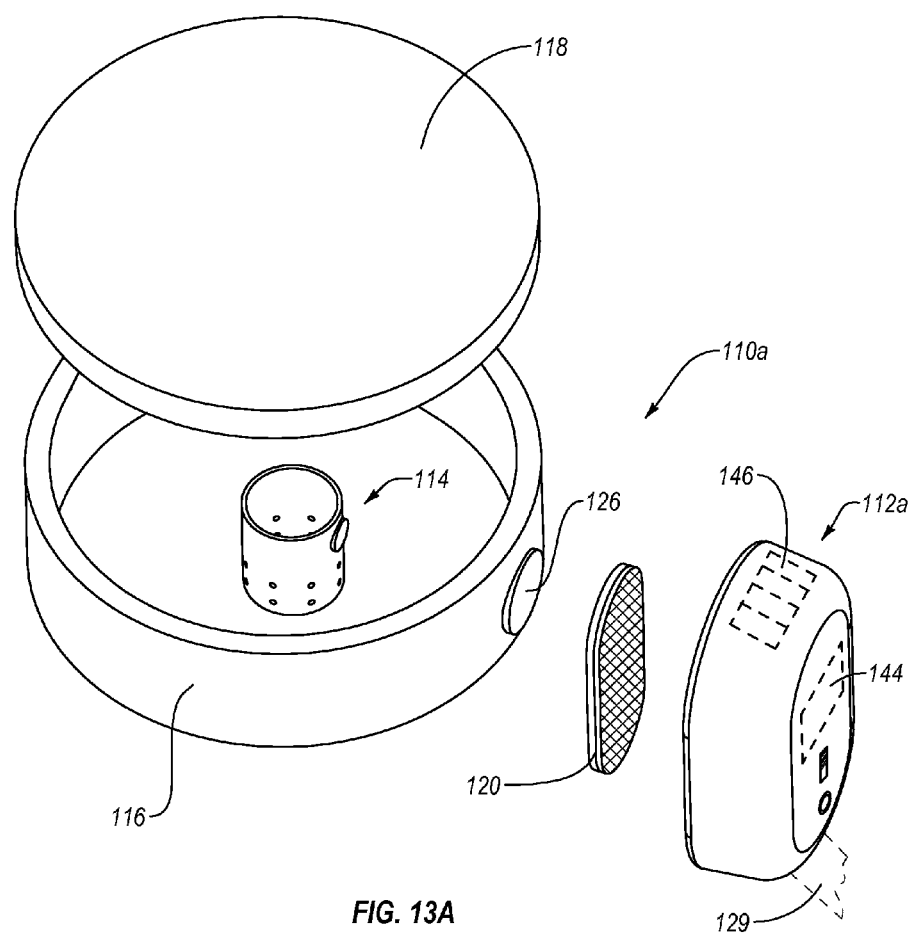
FIG. 13A demonstrates yet another embodiment of a fish food dispensing assembly 110a of the present invention, assembly 110a being shown in an exploded view.

As shown in FIG. 13A, in an alternative embodiment, a handle 112A of the present invention includes an electronic display panel 114 for displaying conditions within aquarium 136, such as temperature, pH, Oxygen and Nitrogen saturation, etc. Display panel 114 communicates with a sensor within aquarium, e.g., a sensor coupled to the brush plate and/or containment ring, for example. A solar panel 146 mounted on the housing of handle 112 and coupled to rechargeable batteries within handle 112a can be employed to power the lights and/or the electronic display panel 144. As shown in FIG. 13a, an extension handle 129, e.g., as discussed with respect to FIG. 1, can be linked to the handle member 112a (and/or handle 112) for reaching difficult to reach aquariums.

Magnetic linking or similar terms as described and claimed herein may comprising orienting corresponding magnets with opposing polar relationships such that items become magnetically linked when the items are in close enough proximity to each other to become magnetically linked, or it may comprise magnetically linking one or more magnets to a metallic surface that is attracted to magnets, for example.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fish food dispensing assembly comprised of:
a handle member;
a perforated container configured to receive fish food therein and dispense fish food therefrom in a liquid environment; and
a fish food containment ring configured to be magnetically linked to the perforated container and to the handle member with the perforated container positioned within the fish food containment ring, the containment ring configured to be magnetically linked to the handle member while the containment ring is on an opposite side of an aquarium panel from the handle member, such that the fish food dispensing assembly can be moved with respect to an aquarium by moving the handle member in order to position the fish food dispensing assembly in a selected location for feeding fish within the aquarium and such that the fish food is dispensed within the selected location, substantially preventing the fish food from extending to other locations within the aquarium, and further comprising:
a lid for mounting on the containment ring, the lid configured to completely cover one side of the containment ring when the lid is mounted on the containment ring.

2. A fish food dispensing assembly as recited in claim 1 wherein the lid is mounted on the containment ring, after which the containment ring and lid are inverted.

3. A fish food dispensing assembly as recited in claim 1 further comprising a brush plate that is configured to be magnetically linked to the containment ring and the handle member with the panel of the aquarium between the brush plate and the handle member, wherein the containment ring orients the brush plate substantially parallel to the handle member.

4. A fish food dispensing assembly as recited in claim 1 wherein the containment ring is employed to maintain floating food within a desired position.

5. A fish food dispensing assembly as recited in claim 1 wherein the containment ring is employed to maintain sinking food within a desired position in the aquarium.

6. A fish food dispensing assembly as recited in claim 1, further comprising a hook extending from a body of the handle member for mounting the handle member onto an aquarium wall.

7. A fish food dispensing assembly as recited in claim 1, wherein the fish food dispensing assembly can be employed to simultaneously dispense food to fish and to clean the panel of the aquarium.

8. A fish food dispensing assembly as recited in claim 1, further comprising one or more light sources on the handle member for illuminating the aquarium.

9. A fish food dispensing assembly as recited in claim 8, wherein the one or more light sources emit different colors of light, thereby illuminating the aquarium with different colors.

10. A fish food dispensing assembly as recited in claim 1, wherein one or more magnets mounted on the containment ring are mounted on a ring body of the containment ring such that more of the mass of the one or more magnets is positioned below a midpoint of the ring body than is positioned above the midpoint of the ring body.

11. An assembly as recited in claim 1, wherein a majority or all of the mass of a magnet of the perforated container is positioned above a midpoint of the perforated container to enable a substantial portion of the perforated container to be located below the water level while the containment ring floats in a liquid in the aquarium such that containment ring contains fish food within containment ring.

12. A fish food dispenser assembly as recited in claim 1, further comprising a brush plate, wherein the perforated container is configured to be magnetically linked to the handle member, the brush plate and the containment ring, such that the fish food dispensing assembly can be moved with respect to the aquarium by moving the handle member in order to clean the aquarium and to position the fish food dispensing assembly in desired locations for feeding fish within the aquarium, wherein the fish food dispensing assembly can be employed to simultaneously dispense food to fish and to clean the panels of the aquarium.

13. An aquatic assembly for creating an ecosystem for marine wildlife, the aquatic assembly comprising:
    an aquarium configured to contain a liquid therein with marine life existing within the liquid in the aquarium; and
    a fish food dispensing assembly configured to be mounted to the aquarium, the fish food dispensing assembly comprising:
        a handle member having one or more light sources for illuminating the aquarium to thereby attract fish toward the dispensing assembly; and
        a perforated container configured to receive fish food therein and to dispense fish food therefrom in a liquid environment;
        a fish food containment ring configured to be magnetically linked to the perforated container with the perforated container positioned within the containment ring; and
        a brush plate configured to be magnetically linked to the containment ring and the handle member, wherein the brush plate is configured to be magnetically linked to the handle member with an aquarium panel between the handle member and the brush plate, such that the brush plate moves against the aquarium panel when the handle member is moved with respect to the aquarium, wherein the containment ring orients the brush plate in a position substantially parallel to the handle member,
    such that the fish food dispensing assembly can be moved with respect to the aquarium by moving the handle member in order to position the fish food dispensing assembly in a selected location for feeding fish within the aquarium, such that fish food dispensed within the aquarium is dispensed within the selected location, substantially preventing the fish food from extending to other locations within the aquarium,
    wherein the fish food dispensing assembly can be employed to simultaneously dispense food to fish and to clean the panels of the aquarium, and
    wherein the one or more light sources of the handle emit different colors of light, thereby illuminating the aquarium with different colors.

14. An assembly as recited in claim 13, further comprising an extension handle coupled to the handle member.

15. A method for dispensing fish food within an aquarium filled with a liquid, comprising:
    providing an aquarium filled with a liquid;
    providing a perforated container and a handle member that are configured to be selectively, magnetically linked to each other;
    providing a fish food containment ring configured to be magnetically linked to the perforated container and to the handle member;
    placing fish food within the perforated container;
    placing the containment ring within the aquarium;
    placing the perforated container within the containment ring such that the containment ring is inside the aquarium and the perforated container is inside the containment ring and such that the handle member is outside of the aquarium, such that the containment ring is magnetically linked to handle member and the perforated container, and such that the liquid within the aquarium moistens the fish food within the perforated container and moves the fish food out of the perforated container, and such that the fish food dispensed within the aquarium is dispensed within a selected location, substantially preventing the fish food from extending to other locations within the aquarium.

16. A method as recited in claim 15, further comprising a lid for covering the containment ring, and further comprising:
    (A) allowing fish food in the perforated container to soak in the liquid and
    (B) inverting the perforated container such that food is moved onto the lid.

17. A method as recited in claim 15, further comprising a brush plate that is configured to be magnetically linked to the containment ring and the handle member with a panel of the aquarium between the brush plate and the handle member and with the perforated container inside the containment ring, and further comprising cleaning the aquarium using the brush plate, wherein the containment ring orients the brush plate in a position substantially parallel with the handle member.

18. A method as recited in claim 15, further comprising illuminating the aquarium using the dispensing assembly.

19. A fish food dispensing assembly comprised of:
    a handle member;
    a perforated container configured to receive fish food therein and dispense fish food therefrom in a liquid environment; and a fish food containment ring configured to be magnetically linked to the perforated container and to the handle member with the perforated container positioned within the fish food containment ring, the containment ring configured to be magnetically linked to the handle member while the containment ring is on an opposite side of an aquarium panel from the handle member, such that the fish food dispensing assembly can be moved with respect to an aquarium by moving the handle member in order to position the fish food dispensing assembly in a selected location for feeding fish within the aquarium and such that the fish food is dispensed within the selected location, substantially preventing the fish food from extending to other locations within the aquarium, and further comprising:

a lid for mounting on the containment ring, wherein the lid is mounted on the containment ring, after which the containment ring and lid are inverted.

20. A fish food dispensing assembly as recited in claim 19, further comprising one or more light sources on the handle member for illuminating the aquarium.

\* \* \* \* \*